US012658196B2

(12) United States Patent
Keshet et al.

(10) Patent No.: US 12,658,196 B2
(45) Date of Patent: Jun. 16, 2026

(54) MACHINE-LEARNING-BASED SPEECH PRODUCTION CORRECTION

(71) Applicants: RAMBAM MED-TECH LTD., Haifa (IL); BAR-ILAN UNIVERSITY, Ramat Gan (IL)

(72) Inventors: Joseph Keshet, Tel-Aviv (IL); Talia Ben-Simon, Ra'anana (IL); Felix Kreuk, Lod (IL); Jacob T. Cohen, Tel-Aviv (IL); Faten Awwad, Haifa (IL)

(73) Assignees: RAMBAM MED-TECH LTD., Haifa (IL); BAR-ILAN UNIVERSITY, Ramat Gan (IL)

( * ) Notice: Subject to any disclaimer, the term of this patent is extended or adjusted under 35 U.S.C. 154(b) by 230 days.

(21) Appl. No.: 18/276,171

(22) PCT Filed: Feb. 8, 2022

(86) PCT No.: PCT/IL2022/050158
§ 371 (c)(1),
(2) Date: Aug. 7, 2023

(87) PCT Pub. No.: WO2022/168102
PCT Pub. Date: Aug. 11, 2022

(65) Prior Publication Data
US 2024/0304200 A1 Sep. 12, 2024

Related U.S. Application Data

(60) Provisional application No. 63/146,782, filed on Feb. 8, 2021.

(51) Int. Cl.
*G10L 21/007* (2013.01)
*G10L 15/04* (2013.01)

(52) U.S. Cl.
CPC ............ *G10L 21/007* (2013.01); *G10L 15/04* (2013.01)

(58) Field of Classification Search
CPC .............................. G10L 21/007; G10L 15/04
See application file for complete search history.

(56) References Cited

U.S. PATENT DOCUMENTS

2007/0038455 A1* 2/2007 Murzina ................. G10L 21/00
704/E21.001
2010/0004931 A1 1/2010 Ma et al.
(Continued)

FOREIGN PATENT DOCUMENTS

CN 109545189 A 3/2019
CN 110598208 A 12/2019

OTHER PUBLICATIONS

Shon, S., Ali, A., & Glass, J. (2018). Convolutional neural networks and language embeddings for end-to-end dialect recognition. arXiv preprint arXiv:1803.04567.*
(Continued)

*Primary Examiner* — Bryan S Blankenagel
(74) *Attorney, Agent, or Firm* — The Roy Gross Law Firm, LLC; Roy D. Gross

(57) ABSTRACT

A system and method of speech modification may include: receiving a recorded speech, comprising one or more phonemes uttered by a speaker; segmenting the recorded speech to one or more phoneme segments (PS), each representing an uttered phoneme; selecting a phoneme segment (PSk) of the one or more phoneme segments (PS); extracting a portion of the recorded speech, said portion corresponding to a first timeframe ($\tilde{T}$) that comprises the selected phoneme segment; receiving a representation ($\widetilde{P}*$) of a phoneme of interest P*; and applying a machine learning (ML) model on (a) the extracted portion of the recorded speech and (b) on (Continued)

the representation ( $\widetilde{P}*$ ) of the phoneme of interest P\*, to generate a modified version of the extracted portion of recorded speech, wherein the phoneme of interest (P\*) substitutes the selected phoneme segment (PSk).

18 Claims, 7 Drawing Sheets

(56)                References Cited

U.S. PATENT DOCUMENTS

| | | | | |
|---|---|---|---|---|
| 2014/0342324 | A1\* | 11/2014 | Ghovanloo | G09B 5/06 |
| | | | | 434/185 |
| 2019/0272819 | A1\* | 9/2019 | Kim | G10L 15/285 |
| 2021/0064822 | A1\* | 3/2021 | Velikovich | G10L 15/083 |
| 2021/0166128 | A1\* | 6/2021 | Daido | G06N 3/08 |
| 2021/0350791 | A1\* | 11/2021 | Gao | G10L 21/10 |
| 2021/0390944 | A1\* | 12/2021 | Richards | G06N 3/04 |
| 2022/0246132 | A1\* | 8/2022 | Zhang | G06N 3/09 |

OTHER PUBLICATIONS

Bhangale, K.B., Mohanaprasad, K. A review on speech processing using machine learning paradigm. Int J Speech Technol 24, 367-388 (2021). https://doi.org/10.1007/s10772-021-09808-0.
B. Wu, M. Yu, L. Chen, M. Jin, D. Su and D. Yu, "Improving Speech Enhancement with Phonetic Embedding Features," 2019 IEEE Automatic Speech Recognition and Understanding Workshop (ASRU), Singapore, 2019, pp. 645-651, doi: 10.1109/ASRU46091.2019. 9003987.
Law J, Boyle J, Harris F, Harkness A, Nye C. Prevalence and natural history of primary speech and language delay: findings from a systematic review of the literature. Int J Lang Commun Disord. Apr. 2000-Jun. 35(2): 165-88. doi: 10.1080/136828200247133. PMID: 10912250.
R. Prenger, R. Valle and B. Catanzaro, "Waveglow: A Flow-based Generative Network for Speech Synthesis," ICASSP 2019—2019 IEEE International Conference on Acoustics, Speech and Signal Processing (ICASSP), Brighton, UK, 2019, pp. 3617-3621, doi: 10.1109/ICASSP.2019.8683143.
S. Strömbergsson, G. Salvi, and D. House, Acoustic and perceptual evaluation of category goodness of /t/ and /k/ in typical and misarticulated children's speech, J. Acoust. Soc. Am. 137, 3422 (2015); doi: 10.1121/1.4921033.
Strombergsson S, Wengelin A, House D. Children's perception of their synthetically corrected speech production. Clin Linguist Phon. Jun. 2014;28(6): 373-95. doi: 10.3109/02699206.2013.868928. Epub Jan. 9, 2014. PMID: 24405224.
Rong, X. (2014). word2vec Parameter Learning Explained. ArXiv, abs/1411.2738.
Ronneberger, O., Fischer, P., & Brox, T. (2015). U-Net: Convolutional Networks for Biomedical Image Segmentation. ArXiv, abs/1505.04597.
Biadsy, F., Weiss, R. J., Moreno, P. J., Kanevsky, D., & Jia, Y. (2019). Parrotron: An end-to-end speech-to-speech conversion model and its applications to hearing-impaired speech and speech separation. arXiv preprint arXiv: 1904.04169.
Chang, Y. L., Lee, K. Y., Wu, P. Y., Lee, H. Y., & Hsu, W. (2019). Deep long audio inpainting. arXiv preprint arXiv:1911.06476.
Black LI, Vahratian A, Hoffman HJ. Communication Disorders and Use of Intervention Services Among Children Aged 3-17 Years: United States, 2012. NCHS Data Brief. Jun. 2015;(205): 1-8. PMID: 26079397.
B Ahmed, P Monroe, A Hair, CT Tan, R Gutierrez-Osuna & KJ Ballard (2018): Speech-driven mobile games for speech therapy: User experiences and feasibility, International Journal of Speech-Language Pathology, DOI: 10.1080/17549507.2018.1513562.

Furlong L, Erickson S, Morris ME. Computer-based speech therapy for childhood speech sound disorders. J Commun Disord. Jul. 2017; 68:50-69. doi: 10.1016/j.jcomdis.2017.06.007. Epub Jun. 15, 2017. PMID: 28651106.
J. McKechnie, B. Ahmed, R. Gutierrez-Osuna, P. Monroe, P. McCabe & K. J. Ballard (2018): Automated speech analysis tools for children's speech production: A systematic literature review, International Journal of Speech-Language Pathology, DOI: 10.1080/17549507.2018.1477991.
A. Marafioti, N. Perraudin, N. Holighaus and p. Majdak, "A Context Encoder For Audio Inpainting," in IEEE/ACM Transactions on Audio, Speech, and Language Processing, vol. 27, No. 12, pp. 2362-2372, Dec. 2019, doi: 10.1109/ TASLP.2019.2947232.
Shriberg LD, Tomblin JB, McSweeny JL. Prevalence of speech delay in 6-year-old children and comorbidity with language impairment. J Speech Lang Hear Res. Dec. 1999;42(6): 1461-81. doi: 10.1044/jslhr.4206.1461. PMID: 10599627.
Strömbergsson, S. (2011). Segmental Re-synthesis of Child Speech Using Unit Selection. In ICPhS (pp. 1910-1913).
Strömbergsson, S. (2012) Synthetic correction of deviant speech—children's perception of phonologically modified recordings of their own speech. Proc. Interspeech 2012, 1131-1134, doi: 10.21437/Interspeech.2012-356.
K Ito and L Johnson. The LJ Speech Dataset. https://keithito.com/LJ-Speech-Dataset/. 2017.
Wren Y, Miller LL, Peters TJ, Emond A, Roulstone S. Prevalence and Predictors of Persistent Speech Sound Disorder at Eight Years Old: Findings From a Population Cohort Study. J Speech Lang Hear Res. Aug. 1, 2016;59(4): 647-73. doi: 10.1044/2015_JSLHR-S-14-0282. Pmid: 27367606; Pmcid: PMC5280061.
Moyer, A. (2013). Foreign Accent: The Phenomenon of Non-native Speech. Cambridge: Cambridge University Press.
Moyer, A. Exceptional Outcomes in L2 Phonology: The Critical Factors of Learner Engagement and Self-Regulation, Applied Linguistics, vol. 35, Issue 4, Sep. 2014, pp. 418-440, https://doi.org/10.1093/applin/amu012.
Dewaele, J. M., & McCloskey, J. (2014). Attitudes towards foreign accents among adult multilingual language users. Journal of Multilingual and Multicultural Development, 36(3), 221-238. https://doi.org/10.1080/01434632.2014.909445.
Moyer, A. (2014). What's Age Got to Do with It? Accounting for Individual Factors in Second Language Accent. Studies in Second Language Learning and Teaching, 4, 443-464. DOI: 10.14746/SSLLT.2014.4.3.4.
Friginal, E. (2008). Linguistic variation in the discourse of outsourced call centers. Discourse Studies—Discourse Stud. 10. 715-736. 10.1177/1461445608096570.
Piske, T. et al. Factors affecting degree of foreign accent in an L2: a review. Journal of Phonetics, vol. 29, Issue 2, Apr. 2001, pp. 191-215. https://doi.org/10.1006/jpho.2001.0134.
Naaman, E., Adi, Y., & Keshet, J. Learning Similarity Functions for Pronunciation Variations. 2017. https://arxiv.org/abs/1703.09817.
Blommaert, J. The sociolinguistics of globalization. 2010. Cambridge University Press.
T. Toda, "Augmented speech production based on real-time statistical voice conversion," 2014 IEEE Global Conference on Signal and Information Processing (GlobalSIP), Atlanta, GA, USA, 2014, pp. 592-596, doi: 10.1109/GlobalSIP.2014.7032186.
Toda, T., Muramatsu, T., & Banno, H. (2012). Implementation of Computationally Efficient Real-Time Voice Conversion. Interspeech. ISCA's 13th Annual Conference Portland, OR, USA, Sep. 9-13, 2012.
Roettger, T. B., Mahrt, T., & Cole, J. (2019). Mapping prosody onto meaning—the case of information structure in American English \*. Language, Cognition and Neuroscience, 34(7), 841-860. https://doi.org/10.1080/23273798.2019.1587482.
Chodroff, E., Cole, J. (2018) Information Structure, Affect and Prenuclear Prominence in American English. Proc. Interspeech 2018, 1848-1852, doi: 10.21437/Interspeech.2018-1529.
Ohtani, Y., Toda, T., Saruwatari, H., Shikano, K. (2009) Many-to-many eigenvoice conversion with reference voice. Proc. Interspeech 2009, 1623-1626, doi: 10.21437/Interspeech.2009-485.

(56)           References Cited

OTHER PUBLICATIONS

Aryal, S., & Gutierrez-Osuna, R. (2016). Comparing Articulatory and Acoustic Strategies for Reducing Non-Native Accents. In INTERSPEECH (pp. 312-316).

Tzeng, E., Hoffman, J., Saenko, K., & Darrell, T. (2017) Adversarial Discriminative Domain Adaptation. https://doi.org/10.48550/arXiv. 1702.0546.

Mor, N., Wolf, L., Polyak, A., & Taigman, Y. (2018) A Universal Music Translation Network. arXiv preprint arXiv: 1805.07848. https://arxiv.org/pdf/1805.07848.pdf.

Engel, J. et al. (2017) Neural Audio Synthesis of Musical Notes with WaveNet Autoencoders. https://doi.org/10.48550/ arXiv.1704. 01279.

Lample, G. et al. (2017) Fader networks: Manipulating images by sliding attributes. https://arxiv.org/abs/1706.00409.

Goodfellow, I. J. et al. (2014) Generative Adversarial Networks. https://doi.org/10.48550/arXiv.1406.2661.

Choi, Y. et al. (2017) StarGAN: Unified Generative Adversarial Networks for Multi-Domain Image-to-Image Translation. https://doi.org/10.48550/arXiv.1711.09020.

Munro, M. J., Derwing, T. M., & Morton, S. L. (2006). The Mutual Intelligibility of L2 Speech. Studies in Second Language Acquisition, 28(1), 111-131. doi: 10.1017/S0272263106060049.

Flege, J. E. The production of "new" and "similar" phones in a foreign language: evidence for the effect of equivalence classification. Journal of Phonetics vol. 15, Issue 1, Jan. 1987, pp. 47-65. https://doi.org/10.1016/S0095-4470(19)30537-6.

Munro, M.J. and Derwing, T.M. (1995) Foreign Accent, Comprehensibility, and Intelligibility in the Speech of Second Language Learners. Language Learning, 45: 73-97. https://doi.org/10.1111/j.1467-1770.1995.tb00963.x.

van den Oord, A., Vinyals, O., & Kavukcuoglu, K. (2017) Neural Discrete Representation Learning. https://doi.org/10.48550/arXiv. 1711.00937.

Kameoka, H. et al. (2018) ACVAE-VC: Non-parallel many-to-many voice conversion with auxiliary classifier variational autoencoder. https://doi.org/10.48550/arXiv.1808.05092.

Kingma, D. P. & Welling, M. (2013) Auto-Encoding Variational Bayes. https://doi.org/10.48550/arXiv.1312.6114.

K.-Y. Park and H. S. Kim, "Narrowband to wideband conversion of speech using GMM based transformation," 2000 IEEE International Conference on Acoustics, Speech, and Signal Processing. Proceedings (Cat. No.00CH37100), Istanbul, Turkey, 2000, pp. 1843-1846 vol.3, doi: 10.1109/ICASSP.2000.862114.

Shahina, A., Yegnanarayana, B. Mapping Speech Spectra from Throat Microphone to Close-Speaking Microphone: A Neural Network Approach. Eurasip J. Adv. Signal Process. 2007, 087219 (2007). https://doi.org/10.1155/2007/87219.

A. Mouchtaris, J. Van der Spiegel and P. Mueller, A spectral conversion approach to the iterative Wiener filter for speech enhancement,2004 IEEE International Conference on Multimedia and Expo (ICME) (IEEE Cat. No.04TH8763), Taipei, Taiwan, 2004, pp. 1971-1974 vol. 3, doi: 10.1109/ICME.2004. 1394648.

Hayes-Harb, R. and Watzinger-Tharp, J. (2012), Accent, Intelligibility, and the Role of the Listener: Perceptions of English-Accented German by Native German Speakers. Foreign Language Annals, 45: 260-282. https://doi.org/10.1111/j.1944-9720.2012.01190.x.

Sonderegger M, Keshet J. Automatic measurement of voice onset time using discriminative structured prediction. J Acoust Soc Am. Dec. 2012; 132(6):3965-79. doi: 10.1121/1.4763995. PMID: 23231126.

J. Keshet, S. Shalev-Shwartz, Y. Singer and D. Chazan, "A Large Margin Algorithm for Speech-to-Phoneme and Music-to-Score Alignment," in IEEE Transactions on Audio, Speech, and Language Processing, vol. 15, No. 8, pp. 2373-2382, Nov. 2007, doi: 10.1109/TASL.2007.903928.

Stouten, V. and van Hamme, H. (2009) Automatic voice onset time estimation from reassignment spectra. Speech Communication, vol. 51, Issue 12, Dec. 2009, pp. 1194-1205. https://doi.org/10.1016/j.specom.2009.06.003.

van Alphen, P. M. and Smits, R. (2004) Acoustical and perceptual analysis of the voicing distinction in Dutch initial plosives: the role of prevoicing. Journal of Phonetics, vol. 32, Issue 4, Oct. 2004, pp. 455-491. https://doi.org/10.1016/j.wocn.2004.05.001.

Lin CY, Wang HC. Automatic estimation of voice onset time for word-initial stops by applying random forest to onset detection. J Acoust Soc Am. Jul. 2011; 130(1): 514-25. doi: 10.1121/1.3592233. PMID: 21786917.

Hansen, J.H.L. and Gray, S.S. and Kim, W. (2010) Automatic voice onset time detection for unvoiced stops (/p/,/t/,/k/) with application to accent classification. Speech Communication, vol. 52, Issue 10, Oct. 2010, pp. 777-789. https://doi.org/10.1016/j.specom.2010.05. 004.

P. Niyogi and P. Ramesh, "Incorporating voice onset time to improve letter recognition accuracies," Proceedings of the 1998 IEEE International Conference on Acoustics, Speech and Signal Processing, ICASSP '98 (Cat. No.98CH36181), Seattle, WA, USA, 1998, pp. 13-16 vol. 1, doi: 10.1109/ICASSP.1998.674355.

Niyogi, P. and Ramesh, P. (2003) The voicing feature for stop consonants: recognition experiments with continuously spoken alphabets. Speech Communication, vol. 41, Issues 2-3, Oct. 2003, pp. 349-367. https://doi.org/10.1016/S0167-6393(02)00151-6.

Fischer E, Goberman AM. Voice onset time in Parkinson disease. J Commun Disord. Jan. 2010-Feb. 43(1):21-34. doi: 10.1016/j.jcomdis. 2009.07.004. Epub Aug. 11, 2009. PMID: 19717164.

Kazemzadeh, A., Tepperman, J., Silva, J., You, H., Lee, S. , Alwan, A., & Narayanan, S. (2006) Automatic Detection of Voice Onset Time Contrasts for Use in Pronunciation Assessment. The Annual Conference of the International Speech Communication Association (Interspeech). 721-724. Available online: [https://www.seas.ucla.edu/spapl/paper/you_icslp_06.pdf].

Taskar, B., Guestrin, C., & Koller, D. (2003) Max-margin Markov networks. In Advances in Neural Information Processing Systems 16 (NIPS 2003). Available online: [https://proceedings.neurips.cc/paper_files/paper/2003/ file/878d5691c824ee2aaf770f7d36c151d6-Paper.pdf].

I. Tsochantaridis et al. 2004. Support vector machine learning for interdependent and structured output spaces. In Proceedings of the twenty-first international conference on Machine learning (ICML '04). Association for Computing Machinery. https://doi.org/10.1145/1015330.1015341.

K. Crammer, O. Dekel, J. Keshet, S. Shalev-Shwartz, and Y. Singer. 2006. Online Passive-Aggressive Algorithms. J. Mach. Learn. Res. 7 (Dec. 1, 2006), 551-585. doi: doi/10.5555/1248547.1248566.

Cho, T. and Ladefoged, P. (1999) Variation and universals in VOT: evidence from 18 languages. Journal of Phonetics, vol. 27, Issue 2, Apr. 1999, pp. 207-229. https://doi.org/10.1006/jpho. 1999.0094.

Yao, Y. (2009). An Exemplar-based Approach to Automatic Burst Detection in Spontaneous Speech. UC Berkeley PhonLab Annual Report, 5. http://dx.doi.org/10.5070/P77f3546t9 Retrieved from https://escholarship.org/uc/item/7f3546t9.

Paterson, N. (2011) Interactions in Bilingual Speech Processing. PhD Thesis. Northwestern University.

D. Talkin "A Robust Algorithm for Pitch Tracking (RAPT)" in Speech Coding and Synthesis, W. B. Kleijn and K. K. Paliwal (eds), pp. 497-518, Elsevier Science B.V., 1995.

Pols, L.C.W. (1983) Three-mode principal component analysis of confusion matrices, based on the identification of Dutch consonants, under various conditions of noise and reverberation. Speech Communication, vol. 2, Issue 4, Dec. 1983, pp. 275-293. https://doi.org/10.1016/0167-6393(83)90045-6.

Smits R, Warner N, McQueen JM, Cutler A. Unfolding of phonetic information over time: a database of Dutch diphone perception. J Acoust Soc Am. Jan. 2003; 113(1):563-74. doi: 10.1121/1.1525287. PMID: 12558292.

A. M. A. Ali, J. Van der Spiegel and p. Mueller, "Acoustic-phonetic features for the automatic classification of stop consonants," in IEEE Transactions on Speech and Audio Processing, vol. 9, No. 8, pp. 833-841, Nov. 2001, doi: 10.1109/89.966086.

Y. Adi, J. Keshet and M. Goldrick, "Vowel duration measurement using deep neural networks," 2015 IEEE 25th International Workshop on Machine Learning for Signal Processing (MLSP), Boston, MA, USA, 2015, pp. 1-6, doi: 10.1109/MLSP.2015.7324331.

(56) References Cited

OTHER PUBLICATIONS

S. Hochreiter and J. Schmidhuber, "Long Short-Term Memory," in Neural Computation, vol. 9, No. 8, pp. 1735-1780, Nov. 15, 1997, doi: 10.1162/neco. 1997.9.8.1735.

A. Graves, N. Jaitly. Towards End-To-End Speech Recognition with Recurrent Neural Networks. Proceedings of the 31st International Conference on Machine Learning, PMLR 32(2): 1764-1772, 2014.

A. Graves, A.-R. Mohamed, & G. Hinton. (2013) Speech Recognition with Deep Recurrent Neural Networks. To appear in ICASSP 2013. https://doi.org/10.48550/arXiv.1303.5778.

Collobert, R., Kavukcuoglu, K., & Farabet, C. (2011). Torch7: A Matlab-like Environment for Machine Learning. Neural Information Processing Systems. Available online: [https://publications.idiap.ch/downloads/papers/2011/Collobert_NIPSWORKSHOP_2011.pdf].

N. Léonard, S. Waghmare, Y. Wang & J.-H. Kim. (2015) rnn : Recurrent Library for Torch. https://doi.org/10.48550/ arXiv.1511.07889.

Hinton, G.E et al. (2012) Improving neural networks by preventing co-adaptation of feature detectors. https://doi.org/10.48550/arXiv.1207.0580.

V. Nair and G. E. Hinton. 2010. Rectified linear units improve restricted boltzmann machines. In Proceedings of the 27th International Conference on International Conference on Machine Learning (ICML'10). Omnipress, Madison, WI, USA, 807-814.

J. Duchi, E. Hazan, and Y. Singer. 2011. Adaptive Subgradient Methods for Online Learning and Stochastic Optimization. J. Mach. Learn. Res. 12, 2121-2159.

Prathosh AP, Ramakrishnan AG, Ananthapadmanabha TV. Estimation of voice-onset time in continuous speech using temporal measures. J Acoust Soc Am. Aug. 2014; 136(2): EL122-8. doi: 10.1121/1.4885768. PMID: 25096135.

Goldrick M, Baker HR, Murphy A, Baese-Berk M. Interaction and representational integration: evidence from speech errors. Cognition. Oct. 2011; 121(1):58-72. doi: 10.1016/j.cognition.2011.05.006. Epub Jun. 12, 2011. PMID: 21669409; PMCID: PMC3150157.

Dmitrieva, O. et al. (2015) Phonological status, not voice onset time, determines the acoustic realization of onset f0 as a secondary voicing cue in Spanish and English. Journal of Phonetics, vol. 49, Mar. 2015, pp. 77-95. https://doi.org/10.1016/j.wocn.2014.12.005.

Adi, Y., Keshet, J., Dmitrieva, O., & Goldrick, M. (2016) Automatic measurement of voice onset time and prevoicing using recurrent neural networks. Proceedings of the Annual Conference of the International Speech Communication Association, INTERSPEECH, vol. 8, pp. 3152-3155. Available online: [https://www.isca-archive.org/interspeech_2016/adi16_interspeech.pdf].

Kiperwasser, E. and Goldberg, Y. (2016) Simple and Accurate Dependency Parsing Using Bidirectional LSTM Feature Representations. https://doi.org/10.48550/arXiv.1603.04351.

Elman, J.L. Distributed representations, simple recurrent networks, and grammatical structure. Mach Learn 7, 195-225 (1991). https://doi.org/10.1007/BF00114844.

Adi Y, Keshet J, Cibelli E, Goldrick M. Sequence Segmentation Using Joint RNN and Structured Prediction Models. Proc IEEE Int Conf Acoust Speech Signal Process. Mar. 2017;2017:2422-2426. doi: 10.1109/ICASSP.2017.7952591. Epub Jun. 19, 2017. PMID: 29033692; PMCID: PMC5638122.

Caruana, R. Multitask Learning. Machine Learning 28, 41-75 (1997). https://doi.org/10.1023/A:1007379606734.

Kubala, F., et al. (1996) Transcribing Radio News. 4th International Conference on Spoken Language Processing (ICSLP 96). Philadelphia, PA, USA. Oct. 3-6, 1996. Available online: [https://www.isca-archive.org/icslp_1996/ kubala96_icslp.html].

D. Rybach, C. Gollan, R. Schluter and H. Ney, "Audio segmentation for speech recognition using segment features," 2009 IEEE International Conference on Acoustics, Speech and Signal Processing, Taipei, Taiwan, 2009, pp. 4197-4200, doi: 10.1109/ICASSP.2009.4960554.

Lisker, L., & Abramson, A. S. (1964). A Cross-Language Study of Voicing in Initial Stops: Acoustical Measurements. WORD, 20(3), 384-422. https://doi.org/10.1080/00437956.1964.11659830.

D. T. Toledano, L. A. H. Gomez and L. V. Grande, "Automatic phonetic segmentation," in IEEE Transactions on Speech and Audio Processing, vol. 11, No. 6, pp. 617-625, Nov. 2003, doi: 10.1109/TSA.2003.813579.

Wang, Y. et al. (2017) Tacotron: Towards End-to-End Speech Synthesis. https://doi.org/10.48550/arXiv.1703.10135.

Y. Saito, S. Takamichi, and H. Saruwatari. 2018. Statistical Parametric Speech Synthesis Incorporating Generative Adversarial Networks. IEEE/ACM Trans. Audio, Speech and Lang. Proc. 26, 1 (Jan. 2018), 84-96. https://doi. org/10.1109/TASLP.2017.2761547.

Kaneko, T., Takaki, S., Kameoka, H., Yamagishi, J. (2017) Generative Adversarial Network-Based Postfilter for STFT Spectrograms. Proc. Interspeech 2017, 3389-3393, doi: 10.21437/Interspeech.2017-962.

Oyamada, K., Kameoka, H., Kaneko, T., Tanaka, K., Hojo, N., & Ando, H. (2018). Generative adversarial network- based approach to signal reconstruction from magnitude spectrogram. European Signal Processing Conference, 2514-2518. https://doi.org/10.23919/EUSIPCO.2018.8553396.

PCT International Search Report and Written Opinion for International Application No. PCT/IL2022/050158, mailed Jun. 7, 2022, 7pp.

* cited by examiner

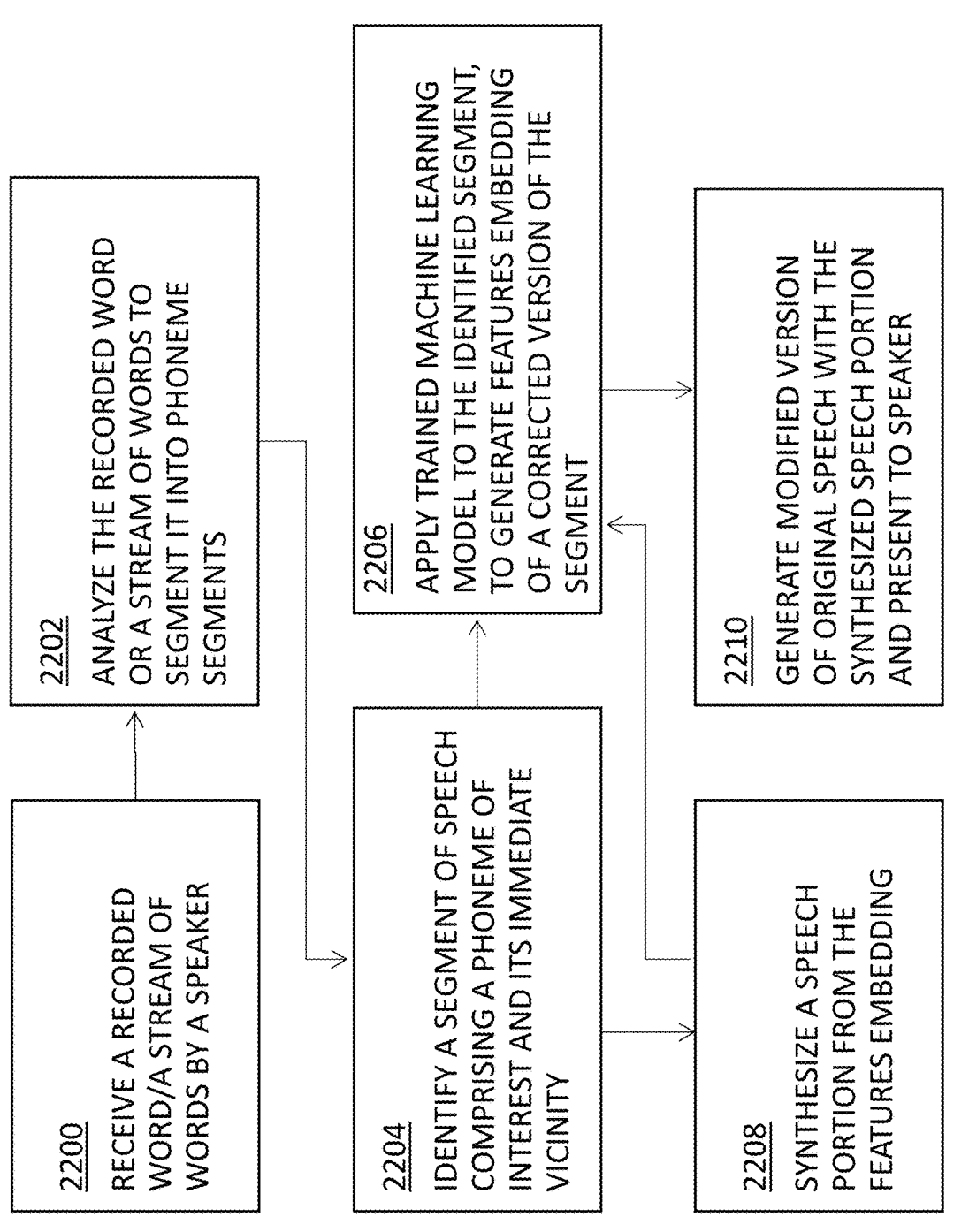

FIG. 3

2200 RECEIVE A RECORDED WORD/A STREAM OF WORDS BY A SPEAKER

2202 ANALYZE THE RECORDED WORD OR A STREAM OF WORDS TO SEGMENT IT INTO PHONEME SEGMENTS

2204 IDENTIFY A SEGMENT OF SPEECH COMPRISING A PHONEME OF INTEREST AND ITS IMMEDIATE VICINITY

2206 APPLY TRAINED MACHINE LEARNING MODEL TO THE IDENTIFIED SEGMENT, TO GENERATE FEATURES EMBEDDING OF A CORRECTED VERSION OF THE SEGMENT

2208 SYNTHESIZE A SPEECH PORTION FROM THE FEATURES EMBEDDING

2210 GENERATE MODIFIED VERSION OF ORIGINAL SPEECH WITH THE SYNTHESIZED SPEECH PORTION AND PRESENT TO SPEAKER

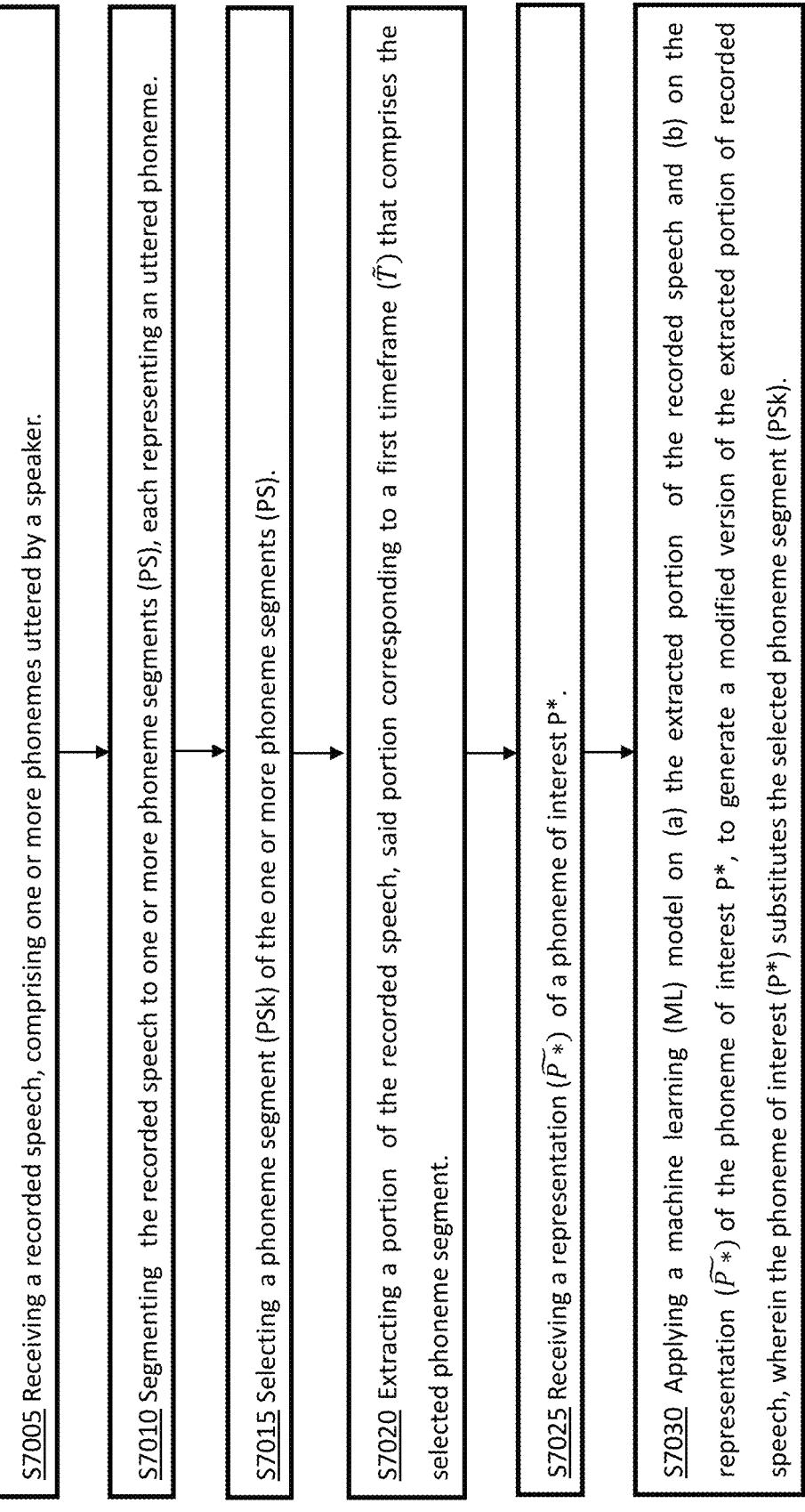

S7005 Receiving a recorded speech, comprising one or more phonemes uttered by a speaker.

S7010 Segmenting the recorded speech to one or more phoneme segments (PS), each representing an uttered phoneme.

S7015 Selecting a phoneme segment (PSk) of the one or more phoneme segments (PS).

S7020 Extracting a portion of the recorded speech, said portion corresponding to a first timeframe ($\widetilde{T}$) that comprises the selected phoneme segment.

S7025 Receiving a representation ($\widetilde{P}*$) of a phoneme of interest P*.

S7030 Applying a machine learning (ML) model on (a) the extracted portion of the recorded speech and (b) on the representation ($\widetilde{P}*$) of the phoneme of interest P*, to generate a modified version of the extracted portion of recorded speech, wherein the phoneme of interest (P*) substitutes the selected phoneme segment (PSk).

FIG. 7

MACHINE-LEARNING-BASED SPEECH PRODUCTION CORRECTION

CROSS-REFERENCE TO RELATED APPLICATIONS

This application is a National Phase of PCT application PCT/IL2022/050158, filed on 8 Feb. 2022, which claims the benefit of priority of U.S. Patent Application No. 63/146, 782, filed Feb. 8, 2021, and entitled: "MACHINE-LEARN-ING-BASED SPEECH PRODUCTION CORRECTION", the contents of which are incorporated herein by reference in their entirety.

FIELD OF THE INVENTION

The invention relates to the field of speech analysis. More specifically, the present invention relates to systems and methods of modifying speech.

BACKGROUND

The term "phoneme" may be used herein to refer to individual units of sound that make up words of a spoken language.

Speech sound disorder (SSD) is a communication disorder in which speakers, particularly young children, have persistent difficulty pronouncing words or sounds correctly. Speech sound production describes the clear articulation of the phonemes (individual sounds) that make up spoken words. Speech sound production requires both the phonological knowledge of speech sounds and the ability to coordinate the jaw, tongue, and lips with breathing and vocalizing to produce speech sounds. By the age of four, most children can correctly pronounce almost all speech sounds. A speaker who does not pronounce the sounds as expected may have a speech sound disorder that may include difficulty with the phonological knowledge of speech sounds or the ability to coordinate the movements necessary for speech.

These communication difficulties can result in a limited ability to participate in social, academic, or occupational environments effectively. Overall, 2.3% to 24.6% of school-aged children were estimated to have speech delay or speech sound disorders.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

In one embodiment, provided herein is a method comprising: receiving a recording of a word, words, a stream of words, and/or an utterance by a speaker, wherein the word, the words, the stream of words, and/or the utterance comprises at least one phoneme of interest, and wherein the at least one phoneme of interest is pronounced incorrectly by the speaker; extracting, from the recording, a segment comprising the phoneme of interest and neighboring phonemes; at a training stage, training a machine learning model on the extracted segment, to learn a feature representation of the extracted segment; and at an inference stage, applying the machine learning model to generate a modified version of the segment, wherein the modified version comprises a corrected pronunciation of the phoneme of interest, based on the learned feature representation and a known desired pronunciation of the phoneme of interest.

In one embodiment, further provided herein that the generated modified version retains voice characteristics of the speaker.

In one embodiment, further provided herein replacing, in the recording, the extracted segment with the modified version of the segment, to generate a modified recording.

In one embodiment, further provided herein that the machine learning model comprises a neural network comprising an encoder-decoder architecture, and wherein the neural network is configured to recover vocal data associated with a speech segment.

In one embodiment, further provided herein that the machine learning model further comprises a classifier configured to predict a similarity between the modified version of the phoneme of interest and the desired pronunciation of the phoneme of interest.

In one embodiment, further provided herein that the machine learning model further comprises a Siamese neural network configured to evaluate a similarity between the modified version of the phoneme of interest and the desired pronunciation of the phoneme of interest, based, at least in part, on acoustic embedding.

In one embodiment, further provided herein synthesizing an audio presentation of the modified version.

In one embodiment, further provided herein presenting the audio presentation modified recording to the speaker.

In addition to the exemplary aspects and embodiments described above, further aspects and embodiments will become apparent by reference to the figures and by study of the following detailed description.

Embodiments of the invention may include a method of speech modification by at least one processor.

According to some embodiments, the at least one processor may be configured to: receive a recorded speech, may include one or more phonemes uttered by a speaker; segment the recorded speech to one or more phoneme segments (PS), each representing an uttered phoneme; select a phoneme segment (PSk) of the one or more phoneme segments (PS); extract a first portion of the recorded speech, said first portion corresponding to a first timeframe ($\hat{T}$) that includes or envelops the selected phoneme segment; receive a representation ($\widetilde{P}*$) of a phoneme of interest P*; and apply a machine learning (MIL) model on (a) the first portion of the recorded speech and (b) on the representation ($\widetilde{P}*$) of the phoneme of interest P*, to generate a modified version of the first portion of recorded speech, where the phoneme of interest (P*) substitutes the selected phoneme segment (PSk).

According to some embodiments, the at least one processor may receive or obtain the representation of the phoneme of interest by calculating an embedding (PE*) such as an embedding vector of the phoneme of interest (P*).

Additionally or alternatively, the at least one processor may analyze the one or more phoneme segments (PS) to generate corresponding phoneme embeddings (PE).

Additionally or alternatively, the at least one processor may select a phoneme segment (PSk) of the one or more phoneme segments by identifying a phoneme segment (PSk) that may include a mispronounced version (P') of the phoneme of interest (P*).

Additionally or alternatively, the at least one processor may identify the phoneme segment of the mispronounced version (P') by: comparing the generated phoneme embedding (PE) of the mispronounced version (P') with the embedding (PE*) of the phoneme of interest (P*); and identifying the phoneme segment (PSk) of the mispronounced version based on said comparison.

According to some embodiments of the invention, the at least one processor may be configured to calculate a feature vector representation (X) of the recorded speech, defining voice characteristics of the speaker. The at least one processor may, extract the first portion of the recorded speech by extracting a section (X$\tilde{\text{T}}$) of the feature vector representation (X), corresponding to the first timeframe ($\tilde{\text{T}}$).

According to some embodiments of the invention, the at least one processor may apply a mask (M) on extracted section (X$\tilde{\text{T}}$), to create a masked version (M$\tilde{\text{T}}$) of the extracted section (X$\tilde{\text{T}}$), wherein a second timeframe (T), defined by borders of the selected phoneme segment (PSk) is masked out.

Additionally or alternatively, the at least one processor may apply the ML model on the first portion of the recorded speech by applying the ML model on the masked version (M$\tilde{\text{T}}$) of the extracted segment (X$\tilde{\text{T}}$). The at least one processor may generate the modified version of the first portion of recorded speech by generating, by the ML model, a feature vector representation ($\tilde{\text{Y}}$) that is a modified version of extracted segment (X$\tilde{\text{T}}$), such that feature vector representation ($\tilde{\text{Y}}$) retains the voice characteristics of the speaker.

Additionally or alternatively, the at least one processor may apply a vocoder module on the feature vector representation (X) and/or feature vector representation ($\tilde{\text{Y}}$), to produce a modified version of the received recorded speech, where the phoneme of interest (P*) substitutes or replaces the selected phoneme segment (PSk).

Additionally or alternatively, the at least one processor may be configured to: calculate a first distance metric, representing a difference between feature vector representation ($\tilde{\text{Y}}$) and the extracted section (X$\tilde{\text{T}}$) in the second timeframe (T); calculate a weighted loss function based on the first distance metric; and train the ML model to generate the modified version of the first portion of recorded speech by minimizing a value of the weighted loss function.

Additionally or alternatively, the at least one processor may be configured to calculate a second distance metric, representing a difference between feature vector representation ($\tilde{\text{Y}}$) and the extracted section (X$\tilde{\text{T}}$) of feature vector representation (X) in the first timeframe ($\tilde{\text{T}}$), excluding the second timeframe (T); and calculate the weighted loss function further based on the second distance metric.

Additionally or alternatively, the at least one processor may be configured to generate a set (S$\tilde{\text{Y}}$) of feature vector representations ($\tilde{\text{Y}}$), each originating from a respective predefined phoneme q*, other than the phoneme of interest p*; calculate a third distance metric, representing a difference between the set (S$\tilde{\text{Y}}$) of feature vector representations ($\tilde{\text{Y}}$) and the extracted section (X$\tilde{\text{T}}$); and calculate the weighted loss function further based on the third distance metric.

Additionally or alternatively, the at least one processor may be configured to segment the feature vector representation ($\tilde{\text{Y}}$) to one or more phoneme segments (PSy); analyze the one or more phoneme segments (PSy) to generate corresponding phoneme embeddings (PEy); calculate a cosine distance between one or more phoneme embeddings (PEy) of feature vector representation ($\tilde{\text{Y}}$) and one or more phoneme embeddings (PE) corresponding to extracted section (X$\tilde{\text{T}}$); and calculate the weighted loss function further based on the cosine distance.

Additionally or alternatively, during a training stage, the recorded speech may include a desired pronunciation of the phoneme of interest P*. In such embodiments, the at least one processor may be configured to omit a second timeframe (T) representing utterance of the desired pronunciation of the phoneme of interest P* from the first portion of recorded speech, so as to create a masked version of the first portion of recorded speech; and train the ML model to reconstruct the first portion of recorded speech from the masked version of the first portion of the recorded speech.

Additionally or alternatively, during a training stage, the at least one processor may be configured to calculate a loss function value, representing a difference between (a) the modified version of the first portion of recorded speech and (b) the first portion of the recorded speech; and train the ML model to reconstruct the first portion of recorded speech from the masked version of the first portion of the recorded speech, based on the calculated loss function value.

According to some embodiments, the ML model may further include a Siamese neural network, configured to evaluate a similarity between said modified version of said phoneme of interest and said desired pronunciation of said phoneme of interest, based, at least in part, on acoustic embedding.

Additionally or alternatively, the at least one processor may be configured to synthesize an audio presentation of said modified version; and present the audio presentation modified recording to said speaker.

Additionally or alternatively, the at least one processor may be configured to define, or receive (e.g., via a user interface) a definition of a treatment protocol that may represent a course of speech therapy. The treatment protocol may include, for example one or more phonemes of interest. The at least one processor may prompt the speaker pronounce the one or more phonemes of interest, resulting in the received recorded speech. Subsequently, the at least one processor may be configured to play the recorded speech data element and/or the modified version of the recorded speech to the speaker as feedback, thus allowing the speaker to improve their pronunciation the phonemes of interest P*.

Additionally or alternatively, the at least one processor may be configured to calculate a metric of the speaker's progress, and alter or modify the treatment protocol based on the calculated progress metric.

Embodiments of the invention may include a system for speech modification. Embodiments of the system may include: a non-transitory memory device, wherein modules of instruction code are stored, and at least one processor associated with the memory device, and configured to execute the modules of instruction code.

Upon execution of the modules of instruction code, the at least one processor may be configured to: receive a recorded speech, that may include one or more phonemes uttered by a speaker; segment the recorded speech to one or more phoneme segments (PS), each representing an uttered phoneme; select a phoneme segment (PSk) of the one or more phoneme segments (PS); extract a first portion of the recorded speech, said first portion corresponding to a first timeframe ($\tilde{\text{T}}$) that may include the selected phoneme segment; receive a representation ($\widetilde{P*}$) of a phoneme of interest P*; and apply a machine learning (ML) model on (a) the first portion of the recorded speech and (b) on the representation ($\widetilde{P*}$) of the phoneme of interest P*, to generate a modified version of the first portion of recorded speech, wherein the phoneme of interest (P*) substitutes the selected phoneme segment (PSk).

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 3 is a flowchart depicting a machine learning-based speech production correction method and stimuli for training patients suffering from speech disorders, according to some embodiments of the present invention;

FIG. 7 is a flow diagram depicting a method of modifying speech by at least one processor, according to some embodiments of the present invention.

DETAILED DESCRIPTION

Disclosed herein are a system, method and computer program product which provide for a machine learning-based speech production correction stimuli for training patients suffering from speech disorders.

Figure 1:
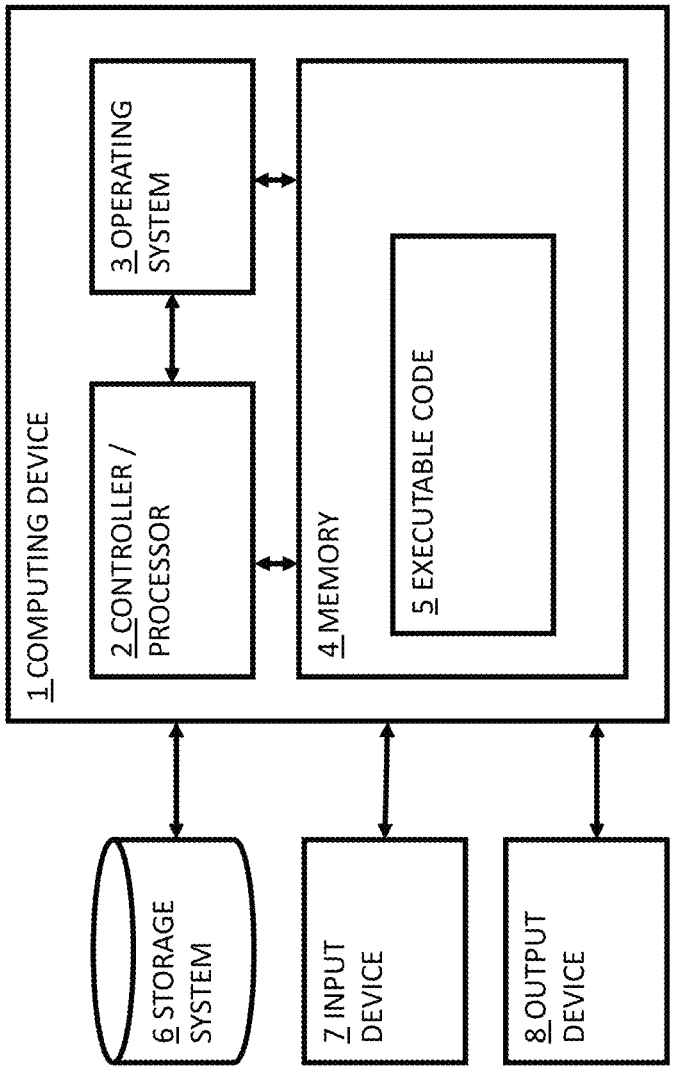
FIG. 1 is a block diagram depicting a computing device, which may be included within an embodiment of a system for modification of speech, according to some embodiments of the invention.

Reference is now made to FIG. 1, which is a block diagram depicting a computing device, which may be included within an embodiment of a system for modification of speech, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3. For example, executable code 5 may be an application that may modify speech as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to speech modification may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

A neural network (NN) or an artificial neural network (ANN), e.g., a neural network implementing a machine learning (ML) or artificial intelligence (AI) function, may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

In some embodiments, a speech production correction stimuli of the present invention automatically generates a patient-specific presentation for a patient, which provides a corrected and/or desired version of a misarticulated and/or mispronounced word, words, stream of words and/or speech utterance, crucially using the speaker's own voice characteristics.

In some embodiments, the present invention provides for real-time, automated re-synthesis of a speaker's speech, to correct misarticulation and/or mispronunciation of a word, words, a stream of words and/or one or more utterances (e.g., one or more phonemes), in a way which preserves characteristics of the original speech, including, but not limited to, perceived speaker voice and identity, naturalness, intonation, and/or rhythm.

In some embodiments, the present invention provides for real-time, automated re-synthesis of a speaker's speech, to correct misarticulation and/or mispronunciation of any one or more phonemes in the speech, which may comprise any one or more phoneme classes, and is not limited to a specific class of phoneme.

Accordingly, in some embodiments, a speech production correction protocol of the present invention may include receiving a recorded speech by a speaker, wherein the speech may comprise incorrect pronunciation of one or more phonemes. In some embodiments, the speech may be analyzed to generate a representation and/or embedding of voice characteristics of the speaker. In some embodiments, the model representation and/or embedding of the voice characteristics of the speaker may be used to automatically re-synthesize a corrected version of one or more segments of the speech that includes incorrect pronunciation. In some embodiments, the re-synthesized segments may be inserted within the original speech, to produce a modified version of the original speech comprising corrected pronunciation of the one or more phonemes which were mispronounced originally. In some embodiments, the modified version of the speech may be presented to the speaker promptly after recording the speech, to provided instantaneous feedback which will encourage learning of a correct pronunciation of the one or more phonemes.

In some embodiments, the present invention provides for identifying a misarticulated word, words, stream of words and/or utterance including a segment thereof (e.g., a phoneme) in an input speech, and for replacing the misarticulated segment with a new word, words, stream of words and/or speech utterance including a segment thereof, wherein the new word, words, stream of words and/or speech utterance including a segment thereof represents corrected and/or desired speech and is based on the input speech word, words, stream of words and/or utterance, and wherein the new word, words, stream of words and/or speech utterance including a segment thereof replaces the corresponding wrongly-pronounced input speech segment. In some embodiments, the replaced segment may be of the same or a slightly different duration as the originally pronounced segment.

In some embodiments, a modified re-synthesized version of an original speech constructed according to the present invention may be presented to the speaker during a self-administered speech therapy session, using an interactive speech therapy system of the present invention. In some embodiments, the modified re-synthesized version of the speech generated according to the present invention may be presented to the speaker in a presentation comprising audio and/or visual output. In some embodiments, the re-synthesized version of the speech may be presented to the user by providing an avatar on a display to communicate the training version of the speech.

By way of background, children generally acquire speech by comparing their own speech production with reference to speech models in their environment. In the learning process, children make articulatory adjustments to tweak their own speech production, to match the reference models, and step by step, their speech approaches the norms of their environment. Children with a phonological disorder (PD) have problems in speech production. The problems are often systematic across the child's speech and affect phonological patterns rather than single speech sounds. For example, a child can display patterns of devoicing of stops, velar fronting, or consonant cluster reductions. However, the child's phonological problems are rarely limited to the production of speech, but are often accompanied by difficulties in perception.

One important factor accounting for the variation in the reported findings from speech perception studies is the nature of the stimuli and to what extent they reflect the children's speech production deficits. For example, research suggests that children with speech production deficits often have difficulties discriminating contrasts that they do not display in their own speech.

Speakers, and particularly children, with speech sound disorder (SSD) are typically referred to speech therapy, which usually takes around 15 weeks. At first, the clinician works with the child on an auditory diagnosis for the distorted sounds at different levels (a sound, a syllable, an expression, and a single word). Next, the work is focused on learning the motor skills of sound production and on the articulator organs during the production, sometimes using visual feedback in addition to auditory feedback. Many research papers show that the most critical part of the treatment is the feedback given to the patient, which helps her or him to develop a correct model of pronunciation.

Because patients typically only see a therapist once a week, there is a critical lack of supervised training. To compensate for this, many therapists give the child assignments for practicing at home. To reach an effective treatment, the patient must practice 3-4 times a day. In practice, children seldom adhere to this schedule. Furthermore, the assignments usually consist of self-looking in a mirror or receiving feedback from a parent. A significant problem with this method is, thus, that the feedback for these assignments is either non-existent or unreliable, because, in some cases, the parents may suffer from a similar untreated disorder.

Attempts to solve those problems with remote face-to-face sessions with therapists have been tried but are very hard to maintain. Another approach is to use automatic speech recognition systems (ASR) to detect the wrong pronunciation and give the patient feedback. However, the performance of such systems on this task is insufficient. The feedback provided by those systems is in the form of a grade of the quality of the production (i.e., "excellent," "good," "medium," "wrong"), but it lack proper guidance as to how to correctly pronounce the word, or precisely the word should sound. On the technical side, the ASR-based systems are trained on adult speakers rather than on children, and are also trained on speakers with no background of any speech or hearing disorders. This limits their performance on children with pronunciation disorders.

Accordingly, in some embodiments, the present invention provides for a speech production correction protocol which automatically generates immediate and accurate feedback to the patient. In some embodiments, the present invention modifies the wrongly-pronounced speech with an automatically-generated version with the corrected pronunciation, using the child's own voice. This version may then be replayed following and/or alongside the original version, to provide accurate guidance with respect to correct pronunciation.

A potential advantage of the present invention is, therefore, in that it provides for an automated speech production correction protocol which generates immediate, accurate feedback for training and guidance purposes. The present protocol may be implemented remotely, for self-training and monitoring, using any desktop or portable computing device, and thus may offer a simple, cost-effective solution for self-training with correct feedback in the child's own voice, without the need for in-person clinic visits or the continual supervision of expert clinicians.

Figure 2:
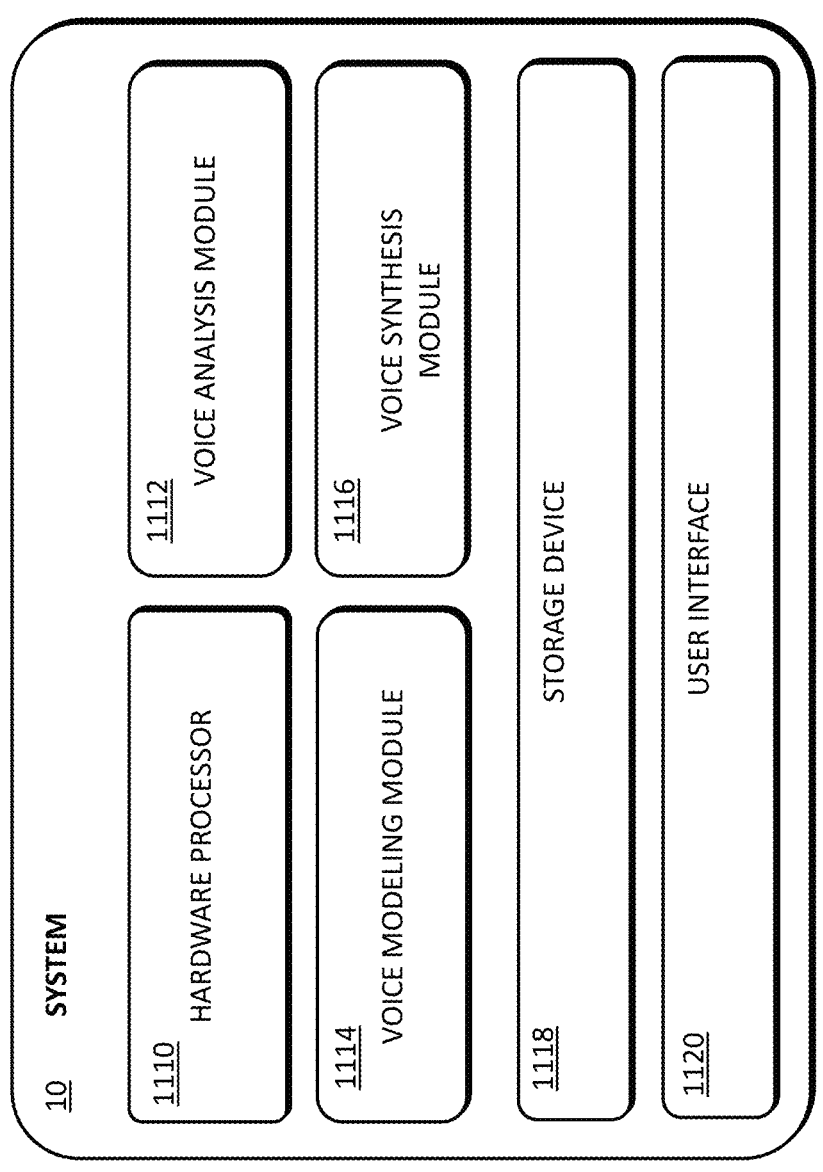
FIG. 2 is a block diagram of an exemplary system for a machine learning-based a speech production correction stimuli for training patients suffering from speech disorders, according to some embodiments of the present invention.

FIG. 2 is a block diagram of an exemplary system 10 for a machine learning-based a speech production correction stimuli for training patients suffering from speech disorders, according to some embodiments of the present invention.

System 10 as described herein is only an exemplary embodiment of the present invention, and in practice may have more or fewer components than shown, may combine two or more of the components, or a may have a different configuration or arrangement of the components. The various components of system 10 may be implemented in hardware, software or a combination of both hardware and software. In various embodiments, system 10 may comprise a dedicated hardware device, or may be implement as a hardware and/or software module into an existing computing device, e.g., any desktop or hand-held device.

System 10 may comprise one or more hardware processors 1110, and a non-transitory computer-readable storage medium 1118. Storage medium 1118 may have encoded thereon software instructions or components configured to operate a processing unit (also "hardware processor", "CPU," or simply "processor"), such as hardware processor 1110. In some embodiments, the software components may include an operating system, including various software components and/or drivers for controlling and managing general system tasks (e.g., memory management, storage device control, power management, etc.), and facilitating communication between various hardware and software components. In some embodiments, the program instructions are segmented into one or more software modules, which may comprise, e.g., a voice analysis module 1112, a voice modeling module 1114, a voice synthesis module 1116, and/or a user interface 1120.

In some embodiments, user interface 1120 comprises one or more of a display for displaying images and videos, a control panel for controlling system, control means (e.g., keyboard, mouse, etc.), a speaker system for providing audio feedback, and/or an imaging device. In some embodiments, user interface 1120 comprises a recording module which may be configured for digitally recording voice samples of subjects at, e.g., a range of specified sampling rates and bit depths.

In some embodiments, system 10 comprises a software application which runs on system 10 and is configured to implement therapy and/or training sessions of the present invention. In some embodiments, the patient application drives the various input and output modalities of system 10 during a patient therapy session. During such a session, the patient application may present interactive audiovisual activities, which are intended to train the patient to pronounce certain sounds, words, or phrases correctly. Instructions may be given to the patient visually via a display and/or audibly via a speaker. A recording module may capture the patient's speech and conveys the captured speech signals to the patient application, which analyzes the sounds, words, and sentences to identify speech particles, phonemes and words. The patient application determines the activities to present to the patient, as well as the audio and visual content of each sequential step of those activities, according to a protocol, typically set by one or more protocol scripts, which are typically configured by a clinician. A protocol may be based on general and patient-specific clinical guidelines and adapted to a given patient, as described further herein. Audio content may include sounds, words and sentences presented. Visual content may include objects or text that the patient is expected to visually or auditory recognize and to express verbally. Activities are intended to integrate patient training into an attractive visual and audio experience, which is also typically custom-designed according to a patient's specific characteristics, such as age and interests.

FIG. 3 is a flowchart of the functional steps is a process for machine learning-based a speech production correction stimuli for training patients suffering from speech disorders, according to some embodiments of the present invention.

In some embodiments, at step 2200, the present invention provides for obtaining or receiving an input word, words, stream of words and/or utterance generated, e.g., by prompting a speaker, who potentially has a phonological speech disorder, to pronounce an utterance, a word, words, and/or a stream of words comprising a sequence of phonemes. In some embodiments, the speaker may be prompted to pronounce, e.g., a word or sequence of words in which a known phoneme of interest, denoted p*, is to be pronounced. In some embodiments, the speaker may be prompted using, e.g., user interface 1120 of system 10 to communicate to a user audio and/or visual prompts. In some embodiments, the word, words, stream of words and/or utterance may be recorded using, e.g., a recording module of user interface 1120.

In some embodiments, at step 2202 the received recorded speech may be analyzed, e.g., using voice analysis module 1112 of system 10.

In some embodiments, the input recorded speech comprises a word sequence denoted by $\overline{w}$, and its corresponding phoneme sequence denoted as $$\overline{p} = (p_1, \ldots, p_K),$$

where $p_k$ is from the set of the phonemes of the language, $\mathcal{P}$.

In some embodiments, p* denotes a phoneme of interest within the input speech which is considered to be mispronounced by the speaker. As noted above, the speaker may be prompted to pronounce a word (or sequence of words) in which the phoneme p* appears.

In some embodiments, the result of the phoneme segmentation operation may be a phoneme sequence $\bar{p}=(p_1, \ldots, p_K)$, wherein the k-th phoneme in this sequence, $p_k$, may be the mispronounced phoneme, e.g., $p_k=p*$, and the first and the last phonemes represent silence.

In some embodiments, the input recorded speech may be segmented into phonemes, e.g., using any suitable segmentation technique, e.g., forced-alignment. Thus, in some embodiments, the input recorded speech $\bar{x}=(x_1, \ldots, x_T)$ may be aligned according to the canonical phoneme sequence Y to get the alignment $\bar{t}=(t_1, \ldots, t_K)$ of the start time of each phoneme.

Accordingly, in some embodiments, the speech may be denoted $$\bar{x} = (x_1, \ldots, x_T)$$

where each $x_t \in R^D$ is a D-dimensional feature vector for $1 \leq t \leq T$. In some embodiments, this feature vector may comprise or represent voice characteristics of the speaker. For example, each feature vector $x_t$ may include or may represent voice characteristics such as frequency bins of the Mel-spectrum or mel-cepstrum of the recorded speech of the speaker.

As known in the art, the term Mel-spectrum or mel-cepstrum may refer to a representation of the short-term power spectrum of a sound, based on a linear cosine transform of a log power spectrum on a nonlinear Mel scale of frequency. It may be appreciated by a person skilled in the art that additional representations of voice characteristics of the speaker may be used as well.

The duration of the word, words, stream of words and/or speech utterance, T, may not fixed. In some embodiments, the portion of the word, words, stream of words and/or speech utterance from time frame $t_1$ to time frame $t_2-1$ may be denoted by:

$$\bar{x}_{t_1}^{t_2} = \left( x_{t_1}, \ldots, x_{t_2-1} \right).$$

Thus, in some embodiments, at step 2202, the input speech may be segmented into individual phonemes in the speech by $\bar{t}=(t_1, \ldots, t_K)$, where $1 \leq t_k \leq T$ is the start time (in number of frames) of the k-th phoneme $p_k$. In some embodiments, the speech segment that is associated with the k-th phoneme $p_k$ is denoted as $$\bar{x}_{t_k}^{t_{k+1}}.$$

In some embodiments, the method of the present invention may take the phoneme boundaries of segment T into account, so as to create a smooth transition when replacing the original speech portion T with a modified re-synthesized one. Accordingly, in some embodiments, the present invention uses a duration T which is longer by a specified time period, e.g., 30% or between 20-45%, from T. Accordingly, the speech segment corresponding to the phoneme $p_k$ with its neighborhood is denoted by $$\tilde{x}_k = \bar{x}_{t_k-\tau}^{t_{k+1}+\tilde{T}-\tau},$$

where $1 < \tau < \tilde{T}$ is selected to be $T=\tilde{T}/2$ whenever possible.

In some embodiments, at step 2204, a masking operation may be applied to the segmented input recorded speech, to isolate a segment of interest comprising the k-th phoneme $p_k$ and its immediate vicinity.

Figure 4:
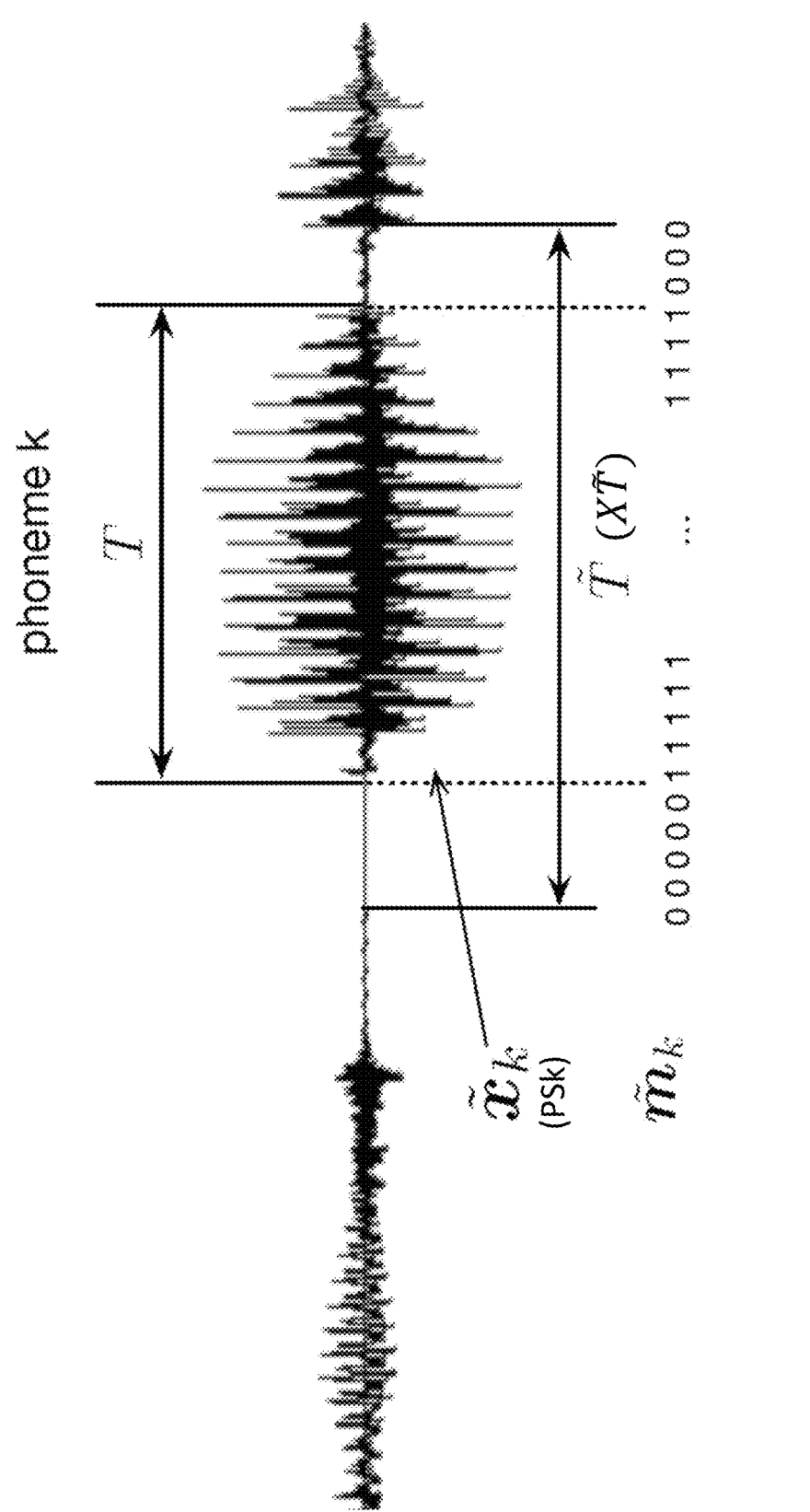
FIG. 4 illustrates a masking operation, according to some embodiments of the present invention.

Thus, a binary masking vector of length $\tilde{T}$ may be defined as $$m_{t_1}^{t_2}$$

whose elements are either 0 or 1. This vector is set to zeros for frames in the region $[t_1, t_2-1]$ and to ones otherwise. For example, as can be seen in FIG. 4, $$\tilde{m}_k = m_{t_k}^{t_{k+1}}$$

may be denoted to be the mask vector of the k-th phoneme $p_k$. Similarly, $$\tilde{p}_{t_1}^{t_2}$$

may be defined as the phoneme embedding sequence, where each of its elements is an embedding of the phoneme symbol at the corresponding time frame. For the phoneme k, the embedding sequence is denoted as $\tilde{p}_k$.

In some embodiments, the result of the masking operation is a speech segment with the mask applied to it, $\tilde{m}_k \odot \tilde{x}_k$, where $\odot$ stands for the element-by-element product, and a sequence of phoneme embedding of the same length $\tilde{p}_k$.

In some embodiments, at step 2206, a trained machine learning model of the present invention may be applied to an input speech segment of length T as generated in step 2204. In some embodiments, a machine learning model of the present invention may be trained to generate an embedding vector for a sequence of speech features. In some embodiments, a machine learning model of the present invention may be deployed using, e.g., voice modeling module 1114 of system 10 in FIG. 2.

Figure 5:
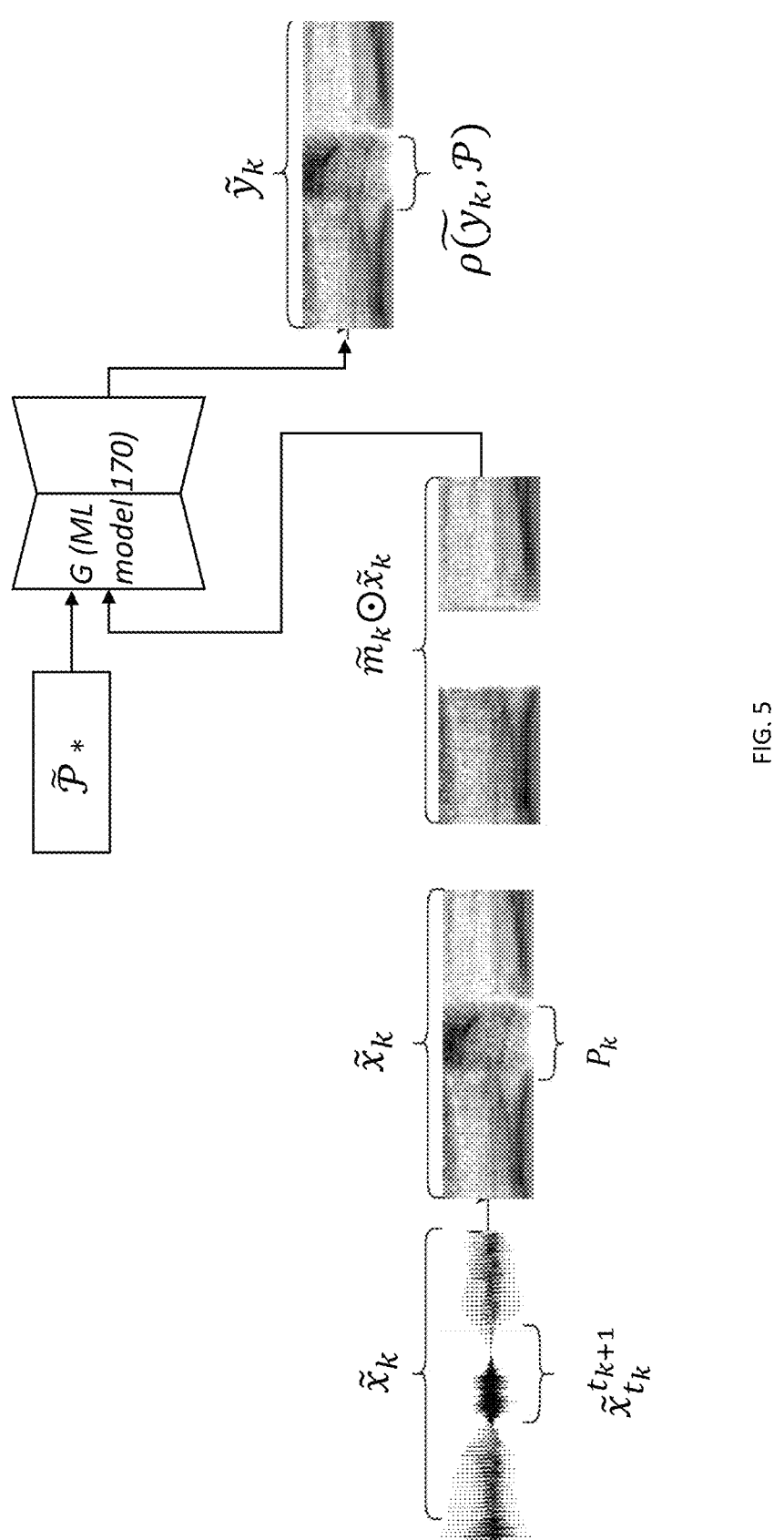
FIG. 5 schematically illustrates a dataflow of a machine learning model, according to some embodiments of the present invention.

FIG. 5 schematically illustrates a dataflow of a machine learning model of the present invention.

In some embodiments, the output of the machine learning model is a speech segment of the same duration T.

The machine learning model's output, $\tilde{y}_k=G(\tilde{m}_k \odot \tilde{x}_k, \tilde{p}_k)$, may be a sequence of vectors with the same representation as $\tilde{x}_k$ (e.g., Mel-spectrum bins), and with the same duration as the input segment. Importantly, the machine learning model uses the portions of the speech for which $\tilde{m}_k$ equals one to recover the missing phoneme.

Accordingly, in some embodiments, a trained machine learning model of the present invention may be trained to recover an acoustic signal spanned by a mispronounced phoneme $p_k$ and its neighborhood, including, e.g., a preceding and subsequent phonemes. In some embodiments, this approach retains as much of the original signal, and fills in any 'missing' phoneme, which is replaced with zeros using the mask operation $\tilde{m}_k$. The model may be based on an encoder-decoder-like architecture. In some embodiments, the machine learning model of the present invention provides for an encoder with a long-enough receptive field configured to capture the contextual information of the phoneme's vicinity, and a decoder configured to accurately generate the missing phoneme while preserving its surrounding voice signal.

In some embodiments, a machine learning model of the present invention may be based on autoencoder neural networks which learn an efficient data coding in an unsupervised manner. The aim of the autoencoders is to learn a representation (encoding) for a set of data. Along with the reduction side, a reconstructing side is learnt, where the autoencoder tries to generate from the reduced encoding a representation as close as possible to its original input, wherein the learned representations of the input may assume useful properties. In some embodiments, the autoencoders may be trained against an adversary discriminative network.

In some embodiments, a machine learning model of the present invention may be trained on unimpaired speech only, e.g., speech that represents accurate pronunciation only. In some embodiments, a machine learning model of the present invention may be trained on input speech comprising a masked segment which is the result of a masking operation as described above, and corresponding to the phoneme $p_k$, wherein the model may be trained to recover this phoneme.

In some embodiments, a machine learning model of the present invention may be trained to (i) recover a phoneme $p_k$ which is similar to the desired phoneme p* (which, during training, represents the original phoneme prior to its masking); and (ii) retain the original neighborhood of the phoneme. The first objective deals with the recovered phoneme. The output of the machine learning model $\tilde{y}_k$ is a speech signal that spans in duration the recovered phoneme as well as its environment. The span area of the recovered phoneme is $(1-\tilde{m}_k)\odot\tilde{y}_k$ and it should be similar to the original signal $(1-\tilde{m}_k)\odot\tilde{x}_k$. Similarly, the second objective deals with the phoneme neighborhood, where the recovered neighborhood $\tilde{m}_k\odot\tilde{y}_k$ should be similar to the original environment $\tilde{m}_k\odot\tilde{x}_k$. In some embodiments, the similarity may be determined using the $\mathcal{L}L_1$ loss function, and the overall objective may be calculated as elaborated in Eq. 1, below:

$$\lambda_1\mathcal{L}_1((1-\tilde{m}_k)\odot\tilde{y}_k,\ (1-\tilde{m}_k)\odot\tilde{x}_k)+\lambda_2\mathcal{L}_1(\tilde{m}_k\odot\tilde{y}_k,\ \tilde{m}_k\odot\tilde{x}_k) \qquad \text{Eq. 1}$$

In some embodiments, a machine learning model of the present invention may be based on an architecture comprising a Convolutional Neural Network (CNN), e.g., a U-Net. A U-Net consists of a contracting path and an expansive path, which gives it a u-shaped architecture. In some embodiments, the structure of the network consists of convolutional layers narrowing from the input size to a bottleneck (down-sampling) and then extending back to the input size (up-sampling). The output of each layer in the down-sampling is fed both to the next convolutional layer and to the corresponding layer in the up-sampling stage. The correspondent connections help to use the contextual information. The down-sampling uses a gradually growing receptive field, thus encoding the contextual information to generate more adequately the desired output.

In some embodiments, a machine learning model of the present invention may further provide for predicting whether a generated speech is associated with the target desired phoneme p*, rather than merely recovering a missing speech part. Accordingly, in some embodiments, a training scheme for a machine learning model of the present invention may provide for additional loss terms to the objective in Eq. (1) above. In some embodiments, this additional loss term is minimized when the reconstructed speech is acoustically associated with the desired phoneme p*. In some embodiments, the present invention provides for training a classifier whose input is a word, words, a stream of words and/or a speech utterance of T frames and its output is the phoneme that was pronounced in this word, words, stream of words and/or utterance. The classifier is trained on annotated speech data, where the objective is the cross entropy loss function. Accordingly, in some embodiments, a machine learning model of the present invention may be configured to predict whether a reconstructed phoneme is similar to the target phoneme p*. In some embodiments, a machine learning model of the present invention may be further configured to generate speech corresponding to any other phoneme $q\neq p^*$, as elaborated in Eq. 2, below:

$$\lambda_3\mathcal{L}^{CE}(C((1-\tilde{m}_k)\odot\tilde{y}_k),\ p^*)+ \qquad\qquad \text{Eq. 2}$$
$$\lambda_4\sum_{q\neq p^*}\mathcal{L}^{CE}(C((1-\tilde{m}_k)\odot G(\tilde{m}_k\odot\tilde{x}_k,\ \tilde{q}_k)),\ q)$$

where $\tilde{q}_k$ is the embedding of the phoneme symbols like $\tilde{p}_k$ with the difference of the k-th phoneme, p* is replaced with q. and $\mathcal{L}^{CE}$ is the cross-entropy loss. Note that during the training of this model the classifier is not updated.

In some embodiments, a machine learning model of the present invention may provide phoneme acoustic embedding in order to evaluate a generated phoneme. In some embodiments, phoneme embedding may be based on the acoustic characteristic of each phoneme. The acoustic phoneme embedding allows the model to measure whether two acoustic inputs can be associated with the same phoneme or not. The phoneme acoustic embedding is a function that gets as input a speech segment $\bar{x}$ of length T and returns a vector of a fixed size L, where L is independent of the input length T. This allows to compare two speech segments of different lengths. To achieve this goal, a Siamese structure model may be trained with cosine similarity loss applied between the embedding vectors. The Siamese net uses the same weights while working in tandem on two different input vectors to compute comparable output vectors.

In some embodiments, a machine learning model of the present invention may be trained to minimize a loss denoted as $\mathcal{L}^{cos}(\bar{x}_1,\bar{x}_2)$, which represents the cosine distance between two speech segments $\bar{x}_1$ and $\bar{x}_2$ with a different durations $T_1$ and $T_2$. This loss is implemented using an acoustic phoneme embedding, as elaborated below in Eq. 3:

$$\lambda_5\mathcal{L}^{cos}(\rho(\tilde{y}_k,\ p^*),\ \bar{z}_{p^*})+\lambda_6\mathcal{L}^{cos}(\rho(G(\tilde{m}_k\odot\tilde{x}_k,\ \tilde{q}_k),\ q),\ \bar{z}_q) \qquad \text{Eq. 3}$$

where $\rho(\tilde{y}_k,p)$ may be an operator that truncates its input to be the speech segment which corresponds to $(t_k, t_{k+1}-1)$, and $\bar{z}_p$ may be a randomly selected example of the phoneme p, that is, a speech segment of phoneme p from the training set.

In practice, q is selected to be from the same phonemic class of p, e.g., if p is /r/ then q might another liquid phoneme (e.g., /w/ or /y/).

In some embodiments, a machine learning model of the present invention may be described as in Eq. 4, below:

$$\lambda_1 \mathcal{L}_1 + \lambda_2 \mathcal{L}_1 + \lambda_5 \mathcal{L}^{cos}(G) + \lambda_6 \mathcal{L}^{cos}(G) \qquad \text{Eq. 4}$$

In some embodiments, with continued reference to step 2206 in FIG. 3, a trained machine learning model of the present invention may be inferenced on a target sample $\tilde{x}_k$, to transform the target sample along with the desired phoneme $p_k$. The output of the inference stage may be given by $G(\tilde{m}_k \odot \tilde{x}_k, \tilde{p}_k)$. In some embodiments, an output of a trained machine learning model of the present invention comprises the spectrogram features of the desired phoneme. In some embodiments, step 2206 utilizes a synthesized speech portion of step 2208.

In some embodiments, at step 2208, an output of a machine learning model of the present invention may be used to synthesize a speech portion comprising the phoneme of interest p* and its surrounding. In some embodiments, at step 2208, an output of a machine learning model of the present invention is used to synthesize a speech portion comprising the phoneme learning model based identification of a segment of speech comprising a phoneme of interest and its immediate vicinity (step 2204) as described hereinabove.

In some embodiments, a synthesized speech portion may be generated using, e.g., voice synthesis module 1116 of system 10 in FIG. 2. In some embodiments, the synthesized generated speech may be used to generate a new speech utterance, word, words, stream of words, and/or segment thereof, wherein the new speech utterance, word, words, stream of words, and/or segment thereof represents corrected and/or desired speech. In some embodiments, the new speech utterance segment, word, words, stream of words, and/or segment thereof is spliced and/or joined into the original input speech, to replace a corresponding wrongly pronounced speech segment. In some embodiments, the result is a modified version of the original input speech comprising corrected pronunciation of a phoneme of interest, which was mispronounced originally. In some embodiments, the synthesized speech portion may be based on recovering phase information of the speech. In some embodiments, recovering phase information may be performed using any suitable means, e.g., the Griffin-Lim algorithm to estimates the missing phase information, and/or using WaveGlow, a flow-based network capable of generating high quality speech from Mel-spectrograms.

In some embodiments, at step 2210, the modified version of the speech may be presented to the speaker, to provided instantaneous feedback which will encourage learning of a correct pronunciation of the one or more phonemes. In some embodiments, the modified version may be presented to the speaker using, e.g., user interface module 1120 of system 10 in FIG. 2. In some embodiments, the modified version of the speech may be presented to the user by providing an avatar on a display to communicate the training version of the speech. In some embodiments, an avatar of the present invention may comprise an animated character appearing on a display of system 10. The avatar may represent an instructor or the clinician. In further embodiments, the motions and communications of the avatar may be controlled by a live clinician in real time, thereby providing a virtual reality avatar interaction. In some embodiments, the avatar may be animated to provide visual cues as to the correct pronunciation and articulation of phonemes and words, e.g., by visually demonstrating correct coordinate jaw, tongue, and lips movement, as may be coordinated with breathing and vocalizing.

Figure 6:
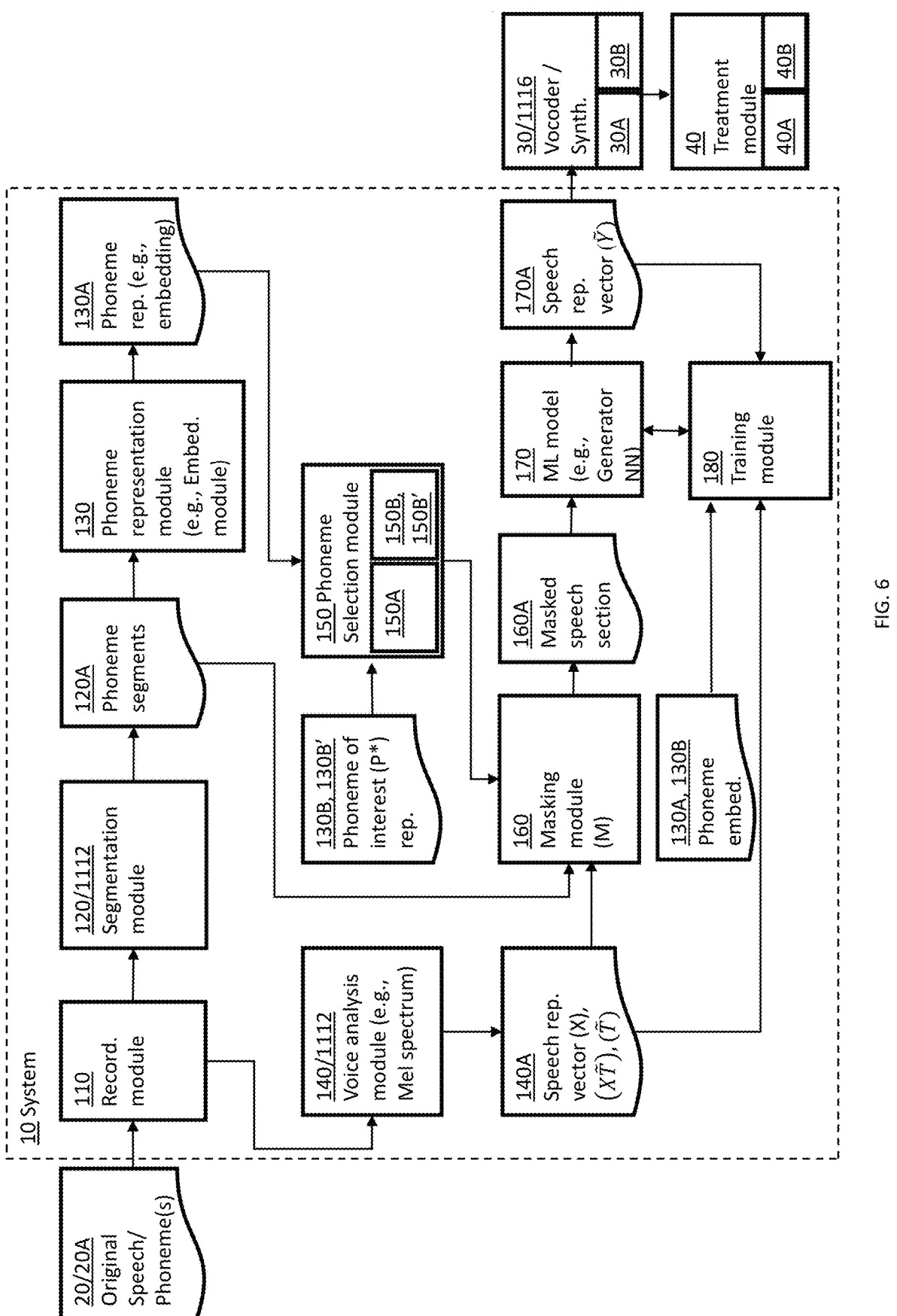
FIG. 6 is a block diagram depicting an additional aspect of a system for modifying speech, according to some embodiments of the present invention.

Reference is now made to FIG. 6, which is a block diagram depicting aspects of system 10 for speech modification, according to some embodiments of the invention. It may be appreciated that system 10 of FIG. 6 may be the same as system 10 of FIG. 2.

According to some embodiments of the invention, system 10 may be implemented as a software module, a hardware module, or any combination thereof. For example, system 10 may be, or may include a computing device such as element 1 of FIG. 1, and may be adapted to execute one or more modules of executable code (e.g., element 5 of FIG. 1) to modify speech, as elaborated herein.

As shown in FIG. 6, arrows may represent flow of one or more data elements to and/or from system 10 and/or among modules or elements of system 10. Some arrows have been omitted in FIG. 6 for the purpose of clarity.

As shown in FIG. 6, system 10 may include, or may be associated with a recording module 110, configured to record a speaker, so as to obtain a speech data element 20. Speech data element 20 may be a data structure (e.g., an audio file, an audio stream, and the like) that may represent the recorded speech of the speaker. The terms "speech" and "speech data element" may be used herein interchangeably. In other words, "speech 20" may be used herein to indicate an audible utterance (e.g., one or more syllables, one or more phonemes, one or more words, a stream of words and the like) produced by the speaker. Additionally, or alternatively, "speech 20" may be used herein to indicate the speech data element 20 (e.g., the audio file) that was produced by recording module 110, and that represents the utterance of the speaker. Similarly, and as shown in FIG. 6, "speech 20" may include one or more phonemes 20A uttered by the speaker. Phonemes 20 may refer herein to both vocal utterances produced by the speaker, and to portions of the speech data element 20 (e.g., the audio file) that include a representation of corresponding, uttered phonemes.

As shown in FIG. 6, system 10 may include a segmentation module 120, configured to segment the received or recorded speech data element 20 to one or more phoneme segments 120A, each corresponding to a phoneme 20A. For example, segmentation module 120 may be configured to apply a "forced alignment" or "phoneme alignment" algorithm, as known in the art, on speech data element 20, so as to produce the one or more phoneme segments 120A.

According to some embodiments, segmentation module 120 may be, or may be included in voice analysis module 1112 of FIG. 2.

Additionally or alternatively, system 10 may include a phoneme representation module 130, also referred to herein as a phoneme embedding module 130. Phoneme representation module 130 may be configured to receive at least one phoneme segment 120A, and obtain or produce a corresponding representation 130A of the received phoneme segment 120A.

For example, phoneme representation module 130 may be configured to calculate an acoustic phoneme embedding vector, as explained herein, as a representation 130A of the relevant phoneme represented by phoneme segment 120A.

Additionally or alternatively, phoneme representation module 130 may be configured to produce representation 130A as a reference or an index, indicating the relevant phoneme. For example, phoneme representation module 130 may produce a "one-hot" index vector, where a single '1' value represents the identity of the relevant phoneme represented by phoneme segment 120A. Other types of representations 130A may also be possible.

Additionally or alternatively, system 10 may receive a representation 130B (e.g., element $\widetilde{P}*$ of FIG. 5) of a phoneme of interest P*. For example, representation 130B may be, or may include a reference or an index (e.g., a "one-hot" index vector) that may identify a specific phoneme of interest P*. In another example, representation 130B may be or may include an embedding vector 130B that may represent the specific phoneme of interest P*.

As shown in FIG. 6, system 10 may include a selection module 150, configured to select a phoneme segment (PSk) 150A of the one or more phoneme segments (PS) 120A.

For example, selection module 150 may receive (e.g., via input device 7 of FIG. 1) a selection (e.g., a manual selection) of a specific phoneme segment 120A of speech 20.

Additionally or alternatively, selection module 150 may be adapted to identify at least one phoneme segment 120A as representing a mispronounced phoneme 20A, and select the identified at least one phoneme segment 120A.

For example, system 10 may include a user interface (UI, e.g., element 8 of FIG. 1), and may utilize the UI to prompt a speaker to read a predetermined text representing a word or a sentence. The user may read the prompted text, and system 10 may produce corresponding phoneme segments 120A, as elaborated herein. Selection module 150 may receive a transcription 130B' of the prompted text to that includes a representation (PE*) (e.g., an embedding vector) of the phoneme of interest (P*) 130B. Selection module 150 may analyze transcription 130B' and phoneme segments (PS) 120A to identifying a phoneme segment (PSk) that includes a mispronounced version (P') of the phoneme of interest (P*), and select the phoneme segment (PSk) 150A corresponding to the identified mispronounced phoneme.

In other words, selection module 150 may compare the representation 130A (e.g., the generated phoneme embedding (PE)) of the mispronounced version (P') with the representation 130B (e.g., embedding (PE*)) of the phoneme of interest (P*), and identify the phoneme segment (PSk) 120A corresponding to the mispronounced version (P') based on the comparison. For example, selection module 150 may calculate a cosine similarity value 150B, defining a similarity between representation 130A and representation 130B (e.g., embedding 130A and embedding 130B), and determine that a relevant phoneme is mispronounced when the cosine similarity value falls below a predetermined threshold. In a complementary manner, selection module 150 may calculate a cosine distance value 150B', defining a distance between representation 130A and representation 130B (e.g., embedding 130A and embedding 130B), and determine that a relevant phoneme is mispronounced when the cosine distance value surpasses a predetermined threshold.

As shown in FIG. 6, system 10 may include a voice analysis module 140, which may be the same as, or included in voice analysis module 1112 of FIG. 2.

As elaborated herein, voice analysis module 140 may analyze speech 20 to calculate a feature vector representation 140A (X), defining voice characteristics of the speaker. For example, feature vector representation (X) 140A may include a plurality of elements Xt, where each Xt is a D-dimensional vector for $1 < t < T$, and where each D-dimensional vector includes frequency bins of a computed Mel-spectrum. Other feature vector representations of the speaker's voice may be used as well.

As elaborated herein (e.g., in relation to FIG. 4 and/or FIG. 5) voice analysis module 140 may be configured to extract a portion of speech 20, corresponding to timeframe T, which includes, or envelops the selected phoneme Xk (represented by a corresponding selected phoneme PSk 150A). In some embodiments, the extraction of the first portion of the recorded speech (e.g., corresponding to timeframe T) may include, or may be implemented by extracting a section (XT̃) of the feature vector representation (X), that corresponds to the timeframe T.

As shown in FIG. 6, system 10 may include a masking module 160. As elaborated herein (e.g., in relation to FIG. 4 and/or FIG. 5) masking module 160 may be configured to apply a mask (M, also denoted "$\hat{m}_k$" in FIGS. 4, 5) on extracted section (XT̃), to create a masked version (MT̃) 160A of the extracted section (XT̃). Masked version (MT̃) 160A is also denoted "$\hat{m}_k \odot \tilde{x}_k$" in FIG. 5. As shown in FIGS. 4 and 5, masked version (MT̃) 160A (e.g., "$\hat{m}_k \odot \tilde{x}_k$") may be characterized by having a second timeframe T (which is defined by the borders of the selected phoneme segment (PSk)) omitted, or masked out.

As shown in FIG. 6, system 10 may include an ML model 170, which may be the same as, or included in model G of FIG. 5.

As elaborated herein, system 10 may apply ML model 170 on the extracted portion (XT̃) of the recorded speech, to generate a feature vector representation 170A (Ỹ, denoted $\tilde{y}_k$ in FIG. 5), where (Ỹ) 170A is a modified version of extracted section (XT̃) of the portion of recorded speech 20. Additionally, or alternatively, and as depicted in FIG. 5, system 10 may apply ML model 170 on the masked version (MT̃) 160A (denoted "$\hat{m}_k \odot \tilde{x}_k$" in FIG. 5) of the extracted segment (XT̃) to generate feature vector representation (Ỹ).

As shown in FIGS. 4 and 5, masked version (MT̃) 160A may include audio information corresponding to time periods that surround the timeframe T of the selected phoneme Xk (represented by phoneme segment PSk). Therefore, by applying ML model 170 on masked version (MT̃) 160A, system 10 may utilize this audio information to generate the modified version (Ỹ) 170A of extracted segment (XT̃), such that feature vector representation (Ỹ) retains voice characteristics of the speaker.

For example, feature vector representation (Ỹ) 170A may be a modified version of extracted segment (XT̃), and may yet include voice characteristics such as mel-spectrum bins that characterize the speaker's voice. It may be appreciated that this retaining of speaker voice characteristics may allow system 10 to seamlessly integrate or concatenate the modified speech portion to other portions of original speech 20. The term "seamless" may be used in this context to indicate lack of noticeable audible difference in tone, volume etc.

As shown in FIG. 6, system 10 may be communicatively connected to a vocoder module 30. Additionally, or alternatively, system 10 may include vocoder module 30. Additionally or alternatively, vocoder module 30 may be the same as, or may be included in voice synthesis module 1116 of FIG. 2.

According to some embodiments, system 10 may apply vocoder module 30 on feature vector representation (Ỹ) to produce a modified version of a portion of recorded speech 20, corresponding to timeframe T̃, where the phoneme of interest (P*) replaces or substitutes the selected phoneme segment (PSk).

Additionally or alternatively, system 10 may apply vocoder module 30 on feature vector representation 140A (X) and feature vector representation (Ỹ) 170A, to produce a modified version 30B of the received recorded speech 20, where the phoneme of interest (P*) substitutes, or replaces the selected phoneme segment (PSk).

For example, vocoder module 30 may be configured to splice feature vector representation 140A (X), to omit a section of recorded speech 20, corresponding to timeframe $\tilde{T}$, and insert or integrate vector representation ($\tilde{Y}$) in place of the omitted section, to obtain a modified version 30A of feature vector representation 140A (X).

Additionally or alternatively, vocoder module 30 may be configured to convert the modified version 30A of feature vector representation 140A (X) to an audio format. For example, modified version 30A may include spectral information (e.g., mel-spectrum bins). In such embodiments vocoder module 30 may apply a spectrum-to-waveform conversion of modified version 30A, to obtain the modified version 30B of the received recorded speech 20.

As shown in FIG. 6, system 10 may be communicatively connected to treatment module 40. Additionally, or alternatively, system 10 may include treatment module 40. Additionally, or alternatively, treatment module 40 may implemented as a user interface (UI) such as input device 7 and/or output device 8 of FIG. 1.

According to some embodiments, treatment module 40 may allow a user (e.g., a clinician) to define, via a UI, a treatment protocol 40A, that may define or represent a course of speech therapy. Treatment protocol 40A may include, for example a list of phonemes, words, and/or sentences of interest that a speaker or patient is to read or pronounce, and be recorded by module 110, resulting in recorded speech data element 20. According to some embodiments, treatment module 40 may present (e.g., as written syllables) or play (e.g., as an audible signal) recorded speech data element 20 and/or modified version 30B to the speaker, as feedback 40B. It may be appreciated that such feedback may be produced automatically, and in near-real time, allowing the speaker to improve their pronunciation of specific syllables or phonemes (e.g., phoneme of interest P*).

Additionally or alternatively, treatment module 40 may be configured to alter or modify treatment protocol 40A, according to the speaker's progress. For example, phoneme selection module may identify mispronounced phonemes of interest (P*), as elaborated herein. Treatment module 40 may subsequently calculate a metric (e.g., a numerical value) representing the speaker's progress (e.g., representing an amount or extent of mispronunciation of phonemes of interest (P*)). Treatment module 40 may be configured to automatically alter treatment protocol 40A based on the calculated progress metric. For example, treatment module 40 may increase a number of phoneme of interest P* that have been identified as mispronounced, to be read by the speaker.

As shown in FIG. 6, system 10 may include a training module 180, configured to train ML model 170.

For example, training module 180 may be configured to calculate a first distance metric, representing a difference between feature vector representation ($\tilde{Y}$) and the extracted section (X$\tilde{T}$) in the second timeframe (T). For example, the first distance metric may be as elaborated in Eq. 1 as:

$\mathcal{L}_1((1-\tilde{m}_k)\odot\tilde{y}_k,(1-\tilde{m}_k)\odot\tilde{x}_k)$. Additionally, training module 180 may be configured to calculate a weighted loss function based on the first distance metric. For example, the weighted loss function (e.g., weighted by $\lambda_1$) may be as elaborated in Eq. 1 as:

$\lambda_1\mathcal{L}_1((1-\tilde{m}_k)\odot\tilde{y}_k,\ (1-\tilde{m}_k)\odot\tilde{x}_k)$. According to some embodiments, training module 180 may be configured to train ML model 170 to generate the modified version

170A of the first portion of recorded speech by minimizing a value of the weighted loss function elaborated above.

In another example, training module 180 may be configured to calculate a second distance metric, representing a difference between feature vector representation ($\tilde{Y}$) and the extracted section (X$\tilde{T}$) of feature vector representation (X) in the first timeframe ($\tilde{T}$), excluding the second timeframe (T). For example, the second distance metric may be as elaborated in Eq. 1 as:

$$\lambda_2\mathcal{L}_2(\tilde{m}_k\odot\hat{y}_k,\tilde{m}_k\odot\tilde{x}_k)$$

training module 180 may be configured to calculate the weighted loss function (e.g., weighted by $\lambda_1$ and $\lambda_2$) based on the first distance metric and the second distance metric, as elaborated in Eq. 1:

$$\lambda_1\mathcal{L}_1((1-\tilde{m}_k)\odot\tilde{y}_k,\ (1-\tilde{m}_k)\odot\tilde{x}_k)+\lambda_2\mathcal{L}_1(\tilde{m}_k\odot\tilde{y}_k,\ \tilde{m}_k\odot\tilde{x}_k).$$

Subsequently, training module 180 may be configured to train ML model 170 to generate the modified version 170A of the first portion of recorded speech by minimizing a value of the weighted loss function as elaborated above.

In another example, training module 180 may be configured to generate set (S$\tilde{Y}$) of one or more feature vector representations ($\tilde{Y}$), each originating from a respective predefined phoneme q*, other than the phoneme of interest p*. Each feature vector representation of the set (S$\tilde{Y}$) of feature vector representations ($\tilde{Y}$) is denoted in Eq. 2 by the symbol $\tilde{q}_k$. Training module 180 may then calculating a third distance metric value, representing a difference between the set (S$\tilde{Y}$) of feature vector representations ($\tilde{Y}$) and the extracted section (X$\tilde{T}$), as elaborated in Eq. 2 as:

$$\sum_{q\neq p^*}\mathcal{L}^{CE}(C((1-\tilde{m}_k)\odot G(\tilde{m}_k\odot\tilde{x}_k,\tilde{q}_k)),\ q)$$

Training module 180 may proceed to calculate the weighted loss function (e.g., weighted by $\lambda_3$, $\lambda_4$) further based on the third distance metric, e.g., as elaborated in Eq. 2:

$$\lambda_3\mathcal{L}^{CE}(C((1-\tilde{m}_k)\odot\tilde{y}_k),\ p^*)+$$
$$\lambda_4\sum_{q\neq p^*}\mathcal{L}^{CE}(C((1-\tilde{m}_k)\odot G(\tilde{m}_k\odot\tilde{x}_k,\tilde{q}_k)),\ q)$$

and may train ML model 170 to generate the modified version 170A of the first portion of recorded speech by minimizing a value of the weighted loss function as elaborated above.

In yet another example, training module 180 may be configured to collaborate with segmentation module 120 to segment the feature vector representation ($\tilde{Y}$) to one or more phoneme segments (PSy), as elaborated herein. Additionally, training module 180 may be configured to collaborate with phoneme representation module 130 to analyze the one or more phoneme segments (PSy), and generate corresponding phoneme embeddings (PEy). training module 180 may subsequently calculate a cosine distance value, representing a cosine distance between one or more phoneme embeddings (PEy) of feature vector representation ($\tilde{Y}$) and one or more phoneme embeddings (PE) corresponding to extracted section (X$\tilde{\text{T}}$). These cosine distance values are denoted in Eq. 3 as elements "$\mathcal{L}^{cos}$".

Training module 180 may proceed to calculate the weighted loss function (e.g., weighted by $\lambda_5$, $\lambda_5$), further based on the calculated cosine distance values, as elaborated in Eq. 3:

$$\lambda_5 \mathcal{L}^{cos}\left(\rho(\tilde{y}_k, p^*), z_{p^*}\right) + \lambda_6 \mathcal{L}^{cos}(\rho(G(\tilde{m}_k \odot \tilde{x}_k, \tilde{q}_k), q), z_q)$$

and may train ML model 170 to generate the modified version 170A of the first portion of recorded speech by minimizing a value of the weighted loss function as elaborated above.

It may be appreciated that any combination of loss functions, such as the loss function examples brought above may also be possible.

According to some embodiments, during a training stage, the recorded speech 20 may be, or may include a desired, or unimpaired pronunciation of a phoneme of interest P*. ML model may be a neural network such as a U-Net or autoencoder, that may be trained to reconstruct the unimpaired pronunciation of phoneme of interest P*, from masked version 160A.

In other words, during a training stage, masking module 160 may omit timeframe T (representing utterance of the desired pronunciation of the phoneme of interest P*) from the first portion of recorded speech (corresponding to timeframe $\tilde{\text{T}}$), thus creating masked version 160A of the extracted portion (corresponding to section X$\tilde{\text{T}}$ and timeframe T) of recorded speech 20. Training module 180 may then train ML model 170 to reconstruct the first portion X$\tilde{\text{T}}$ of recorded speech from masked version 160A of the first portion of the recorded speech 20.

For example, and as elaborated herein, training module 180 may calculate a loss function value, representing a difference between (a) the modified version of the first portion of recorded speech and (b) the first portion of the recorded speech. Subsequently, training module 180 may train ML model 170 to reconstruct the first portion of recorded speech from the masked version 160A of the first portion of the recorded speech, based on the calculated loss function value.

Reference is now made to FIG. 7, which is a flow diagram depicting a method of speech modification by at least one processor (e.g., processor 2 of FIG. 1), according to some embodiments of the invention.

As shown in step 7005, the at least one processor 2 may receive a recorded speech data element (e.g., "Original speech" 20 of FIG. 6). Received speech data element 20 may include, for example a recording of a speaker, and may include one or more phonemes 20A uttered by the speaker.

As shown in step 7010, the at least one processor 2 may employ a segmentation module (e.g., element 120 of FIG. 6, or element 1112 of FIG. 2) to segment the recorded speech data element 20 to one or more phoneme segments (PS) 120A in a process commonly referred to in the art as "phoneme alignment", or "forced alignment". The one or more phoneme segments may each represent an uttered phoneme 20A of the speaker.

As shown in step 7015, the at least one processor 2 may select a phoneme segment (PSk) (e.g., element 150A of FIG. 6) of the one or more phoneme segments (PS) 120A. For example, the at least one processor 2 may receive a selection of the specific phoneme segment 120A from an input device (e.g., element 7 of FIG. 1). Additionally, or alternatively, and as elaborated herein (e.g., in relation to FIG. 6), the at least one processor 2 may employ a selection module 150, adapted to identify at least one phoneme segment 120A as representing a mispronounced phoneme 20A, and select the identified at least one phoneme segment 120A.

As shown in step 7020, the at least one processor 2 may extract a portion of the recorded speech 20, corresponding to a first timeframe that includes the selected phoneme segment 150A. As demonstrated in the example of FIG. 4, the extracted portion of the recorded speech may correspond to timeframe T of FIG. 4, and may include, or envelope a second timeframe, T, which corresponds to the selected phoneme segment 150A (denoted in FIG. 4 as "phoneme k").

As shown in step 7025, the at least one processor 2 may receive a representation (e.g., element $\widetilde{P*}$ of FIG. 5, element 130B of FIG. 6) of a phoneme of interest P*. For example, representation 130B may be, or may include a reference or an index (e.g., a "one-hot" index) that may identify a specific phoneme of interest P*. In another example, as depicted in FIG. 6, representation 130B may be or may include an embedding vector that may represent the specific phoneme of interest P*.

In some embodiments representation 130B (e.g., embedding vector 130B) may the relevant phoneme of interest P* in a context of a specific linguistic parameters, such as a specific language, a specific dialect, a specific accent, and the like.

As shown in step 7030, the at least one processor 2 may apply a machine learning model or algorithm (e.g., generator 170 of FIG. 6, and/or element 'G' on FIG. 5) on (a) the extracted portion of the recorded speech (e.g., denoted $\tilde{m}_k \odot \tilde{x}_k$ in FIG. 5) and (b) on the representation 130B (e.g., denoted $\widetilde{P*}$ in FIG. 5) of the phoneme of interest P*. The ML model 170 may be trained to generate, based on this input, a modified version (e.g., element 170A of FIG. 6, element $\tilde{y}_k$ of FIG. 5) of the extracted portion of recorded speech. As shown in FIG. 5, the modified version (e.g., element 170A of FIG. 6, element $\tilde{y}_k$ of FIG. 5) of the extracted portion of recorded speech 20 may be characterized by having the phoneme of interest (P*) in place of, or substituting or replacing the selected phoneme segment 150A (PSk).

According to some embodiments, during a training phase, recorded speech data element 20 may include a desired, or unimpaired pronunciation of the phoneme of interest P*. As elaborated herein, ML model may be trained based on speech data element 20 to maximize a metric of similarity (e.g., minimize a value of a loss function) between the modified version 170A of the extracted portion of recorded speech 20 and the desired, unimpaired pronunciation.

EXPERIMENTAL RESULTS

The inventors trained a machine learning model of the present invention using an Adam optimizer with an initial learning rate of $10^{-4}$ and early stopping. The machine learning model comprises a U-Net encoder-decoder, wherein each arm of the U-Net comprises five 1D-convolutional layers with p-ReLu activation, in which two layers are down-sampling/up-sampling layers respectively achieved with kernels of size 3, stride 2. No batch norm was used since it shows no improvement to a slight decrease.

A classifier component of the machine learning model comprises four 2D convolutional layers with window size 4×2 and LeakyReLu activation function, using dropout. The last convolution layer's output is fed to a fully connected layer, classifying 39 different phonemes, with cross-entropy loss function as described hereinabove.

A Siamese network of the present machine learning model consisted of one layer of bidirectional GRU with hidden size 300, followed by a liner layer with a ReLu activation function. The network returned the embedding vector, and the loss was the embedding distance, namely, the cosine similarity between the two inputs.

A pre-trained WaveGlow model (see, e.g., R. Prenger, R. Valle and B. Catanzaro, "Waveglow: A Flow-based Generative Network for Speech Synthesis," *ICASSP* 2019—2019 *IEEE International Conference on Acoustics, Speech and Signal Processing (ICASSP)*, Brighton, United Kingdom, 2019, pp. 3617-3621, doi: 10.1109/ICASSP.2019.8683143.) was trained on the LJ Speech dataset (available at https://keithito.com/LJ-Speech-Dataset). This data set consists of 13,100 short audio clips of a single speaker reading passages from 7 non-fiction books. A considerable advantage of the WaveGlow compared to other methods is in training simplicity and inference speed.

The present machine learning model was trained on TIMIT Acoustic-Phonetic Continuous Speech Corpus dataset, after resampling to 22.5 KHz. The training preserved the original train and test split, and further split the training corpus to train and validation sets with a ratio of 0.8 and 0.2. The mel-spectrograms of the original audio were used as the input, with 80 bins, where each bin is normalized by the filter length. The mel-spectrogram parameters were FFT size 1024, hop size 256, and window size 1024. For optimal results, the raw waves were normalized to match LJ speech data range.

The machine learning model of the present invention was further evaluated on several datasets comprising children voices, including mispronounced English, mispronounced Hebrew, mispronounced Arabic, TIMIT and LibriSpeech. Preliminary results only on LibriSpeech are presented hereinbelow.

In some embodiments, the Siamese network of the present invention learned the embedding vector for a sequence of mel-spectrogram features, while requiring that diffident sequences of the same phoneme will be close and vice versa.

Table 1 below shows similarity measures between original examples of /s/ and /sh/ and their corresponding embedding. No similarity is expressed as a 90-degree angle, while total similarity of 1 is a 0-degree angle, i.e., complete overlap.

near real time. Such modifying of speech portions may be integrated, for example, in a system for speech therapy.

The present invention may include several benefits over currently available systems for speech modification.

For example, embodiments of the invention may automatically (e.g., without intervention of a clinician), and adaptively (e.g., based on recoded speech of a speaker) train the speaker to improve pronunciation of phonemes of interest, as elaborated herein.

In another example, embodiments of the invention may provide a modified, corrected version of a speech as feedback to the speaker, and may do so while retaining the speaker's voice characteristics, as elaborated herein.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of speech modification by at least one processor, the method comprising:

selecting a phoneme segment (PSk) in a first portion of a recorded speech, said first portion corresponding to a first timeframe ($\tilde{T}$);

receiving an embedding representation ($\widetilde{P}*$) of a phoneme of interest P*;

applying a trained machine learning (ML) model on (a) the first portion of the recorded speech and (b) on the embedding representation ($\widetilde{P}*$), to generate a modified version of the first portion of recorded speech, wherein the phoneme of interest (P*) substitutes the selected phoneme segment (PSk),

TABLE 1

|  | S | S_gen | SH | SH_gen | W | W_gen |
|---|---|---|---|---|---|---|
| s | 0.94 ± 0.21 | 0.96 ± 0.15 | 0.72 ± 0.21 | 0.96 ± 0.15 | 0.72 ± 0.21 | −0.18 ± 0.117 |
| s_gen | 0.96 ± 0.15 | 0.72 ± 0.21 | 0.72 ± 0.21 | 0.72 ± 0.21 | 0.72 ± 0.21 | 0.72 ± 0.21 |
| sh | 0.92 ± 0.219 | 0.72 ± 0.21 | 0.72 ± 0.21 | 0.72 ± 0.21 | 0.72 ± −0.173 | −0.173 ± 0.124 |
| sh_gen | 0.96 ± 0.15 | 0.72 ± 0.21 | 0.72 ± 0.21 | 0.72 ± 0.21 | 0.72 ± 0.21 | 0.72 ± 0.21 |
| w | −0.18 ± 0.117 | 0.72 ± 0.21 | −0.173 ± 0.124 | 0.72 ± 0.21 | 0.72 ± 0.21 | 0.566 ± 0.448 |
| r | 0.017 ± 0.096 | 0.27 ± 0.21 | 0.72 ± 0.21 | 0.72 ± 0.21 | 0.72 ± 0.21 | 0.253 ± 0.419 |

The present invention may be a system, a method, and/or a computer program product. The computer program product may include a computer readable storage medium (or media) having computer readable program instructions thereon for causing a processor to carry out aspects of the present invention.

Embodiments of the invention may include a practical application for modifying portions of speech in real-time or wherein training the ML model comprises:

calculating a feature vector representation (X) of the recorded speech, defining voice characteristics of a speaker, extracting a section (X$\tilde{T}$) of the feature vector representation (X), corresponding to the first timeframe ($\tilde{T}$), generating a feature vector representation ($\tilde{Y}$) of the modified version of the first portion of recorded speech;

calculating a first distance metric, representing a difference between feature vector representation ($\tilde{Y}$) and the extracted section ($\tilde{XT}$) of feature vector representation (X) in the first timeframe ($\tilde{T}$), excluding a second timeframe (T), defined by borders of the selected phoneme segment (PSk);

calculating a weighted loss function based on the first distance metric; and training the ML model to generate the modified version of the first portion of recorded speech by minimizing a value of the weighted loss function.

2. The method of claim 1, wherein receiving the representation of the phoneme of interest comprises calculating an embedding (PE*) of the phoneme of interest (P*), and wherein the method further comprises:

segmenting the recorded speech to one or more phoneme segments (PS), each representing an uttered phoneme; and analyzing the one or more phoneme segments (PS) to generate corresponding phoneme embeddings (PE), and wherein selecting a phoneme segment (PSk) of the one or more phoneme segments comprises identifying a phoneme segment (PSk) that comprises a mispronounced version (P') of the phoneme of interest (P*).

3. The method of claim 2, wherein identifying the phoneme segment of the mispronounced version (P') comprises:

comparing the generated phoneme embedding (PE) of the mispronounced version (P') with the embedding (PE*) of the phoneme of interest (P*); and identifying the phoneme segment (PSk) of the mispronounced version based on said comparison.

4. The method of claim 2, further comprising applying a mask (M) on extracted section ($\tilde{XT}$), to create a masked version ($\tilde{MT}$) of the extracted section ($\tilde{XT}$), wherein a second timeframe (T), defined by borders of the selected phoneme segment (PSk) is masked out.

5. The method of claim 4, wherein applying the ML model on the first portion of the recorded speech comprises applying the ML model on the masked version ($\tilde{MT}$) of the extracted section ($\tilde{XT}$), and wherein generating a modified version of the first portion of recorded speech comprises generating the feature vector representation ($\tilde{Y}$) of the modified version of extracted segment ($\tilde{XT}$), such that feature vector representation ($\tilde{Y}$) retains voice characteristics of the speaker.

6. The method of claim 5, further comprising applying a vocoder module on feature vector representation (X) and feature vector representation ($\tilde{Y}$), to produce a modified version of the received recorded speech, wherein the phoneme of interest (P*) substitutes the selected phoneme segment (PSk).

7. The method of claim 6, further comprising:

defining a treatment protocol, that represents a course of speech therapy, said treatment protocol comprising one or more phonemes of interest;

prompting the speaker pronounce the one or more phonemes of interest, resulting in the received recorded speech; and playing the recorded speech data element and/or the modified version of the recorded speech to the speaker as feedback, thus allowing the speaker to improve their pronunciation of the phonemes of interest P*.

8. The method of claim 7, further comprising:

calculating a metric of the speaker's progress; and altering the treatment protocol based on the calculated progress metric.

9. The method of claim 1, further comprising:

generating a set ($S\tilde{Y}$) of feature vector representations ($\tilde{Y}$), each originating from a respective predefined phoneme Q*, other than the phoneme of interest P*;

calculating a third distance metric, representing a difference between the set ($S\tilde{Y}$) of feature vector representations ($\tilde{Y}$) and the extracted section ($\tilde{XT}$); and calculating the weighted loss function further based on the third distance metric.

10. The method of claim 1, further comprising:

segmenting the feature vector representation ($\tilde{Y}$) to one or more phoneme segments (PSy);

analyzing the one or more phoneme segments (PSy) to generate corresponding phoneme embeddings (PEy);

calculating a cosine distance between one or more phoneme embeddings (PEy) of feature vector representation ($\tilde{Y}$) and one or more phoneme embeddings (PE) corresponding to extracted section ($\tilde{XT}$); and calculating the weighted loss function further based on the cosine distance.

11. The method of claim 1, wherein during a training stage, the recorded speech comprises a desired pronunciation of the phoneme of interest P*.

12. The method of claim 11, wherein the training stage further comprises:

omitting a second timeframe (T) representing utterance of the desired pronunciation of the phoneme of interest P* from the first portion of recorded speech, thus creating a masked version of the first portion of recorded speech; and training the ML model to reconstruct the first portion of recorded speech from the masked version of the first portion of the recorded speech.

13. The method of claim 12, further comprising:

calculating a loss function value, representing a difference between (a) the modified version of the first portion of recorded speech and (b) the first portion of the recorded speech; and training the ML model to reconstruct the first portion of recorded speech from the masked version of the first portion of the recorded speech, based on the calculated loss function value.

14. The method of claim 12, wherein said ML model further comprises a Siamese neural network, configured to evaluate a similarity between said modified version of said phoneme of interest and said desired pronunciation of said phoneme of interest, based, at least in part, on acoustic embedding.

15. The method of claim 1, further comprising: synthesizing an audio presentation of said modified version; and presenting said audio presentation modified recording to said speaker.

16. The method of claim 1, further comprising:

calculating a second distance metric, representing a difference between feature vector representation ($\tilde{Y}$) and the extracted section ($\tilde{XT}$) in the second timeframe (T); and calculating the weighted loss function further based on the second distance metric.

17. A system for speech modification, the system comprising: a non-transitory memory device, wherein modules of instruction code are stored, and at least one processor associated with the memory device, and configured to execute the modules of instruction code, whereupon execution of said modules of instruction code, the at least one processor is configured to:

select a phoneme segment (PSk) in a first portion of a recorded speech said first portion corresponding to a first timeframe ($\tilde{T}$);

receive an embedding representation ($\widetilde{P*}$) of a phoneme of interest P*;

apply a trained machine learning (ML) model on (a) the first portion of the recorded speech and (b) on the embedding representation ($\widetilde{P*}$), to generate a modified version of the first portion of recorded speech, wherein the phoneme of interest (P*) substitutes the selected phoneme segment (PSk), wherein training the ML model comprises:

calculating a feature vector representation (X) of the recorded speech, defining voice characteristics of a speaker, extracting a section (X$\tilde{T}$) of the feature vector representation (X), corresponding to the first timeframe ($\tilde{T}$), generating a feature vector representation ($\tilde{Y}$) of the modified version of the first portion of recorded speech;

calculating a first distance metric, representing a difference between feature vector representation ($\tilde{Y}$) and the extracted section (X$\tilde{T}$) of feature vector representation (X) in the first timeframe ($\tilde{T}$), excluding a second timeframe (T), defined by borders of the selected phoneme segment (PSk);

calculating a weighted loss function based on the first distance metric; and training the ML model to generate the modified version of the first portion of recorded speech by minimizing a value of the weighted loss function.

18. The system of claim 17, wherein the at least one processor is further configured to:

generate a set (S$\tilde{Y}$) of feature vector representations ($\tilde{Y}$), each originating from a respective predefined phoneme Q*, other than the phoneme of interest P*;

calculate a second distance metric, representing a difference between the set (S$\tilde{Y}$) of feature vector representations ($\tilde{Y}$) and the extracted section (X$\tilde{T}$); and calculating the weighted loss function further based on the second distance metric.

* * * * *